Aug. 12, 1941.                H. D. RALSTON ET AL                2,252,202
       METHOD OF AND MEANS FOR PROVIDING LOOSE-LEAF CATALOGUE
                     OR FILE LEAVES WITH HINGES
                     Filed March 30, 1938          15 Sheets-Sheet 1

Inventors:
Hurley D. Ralston & Otto Felix,
By:
Parker, Carlson, Pitzner & Hubbard
Attorneys.

Fig. 2.

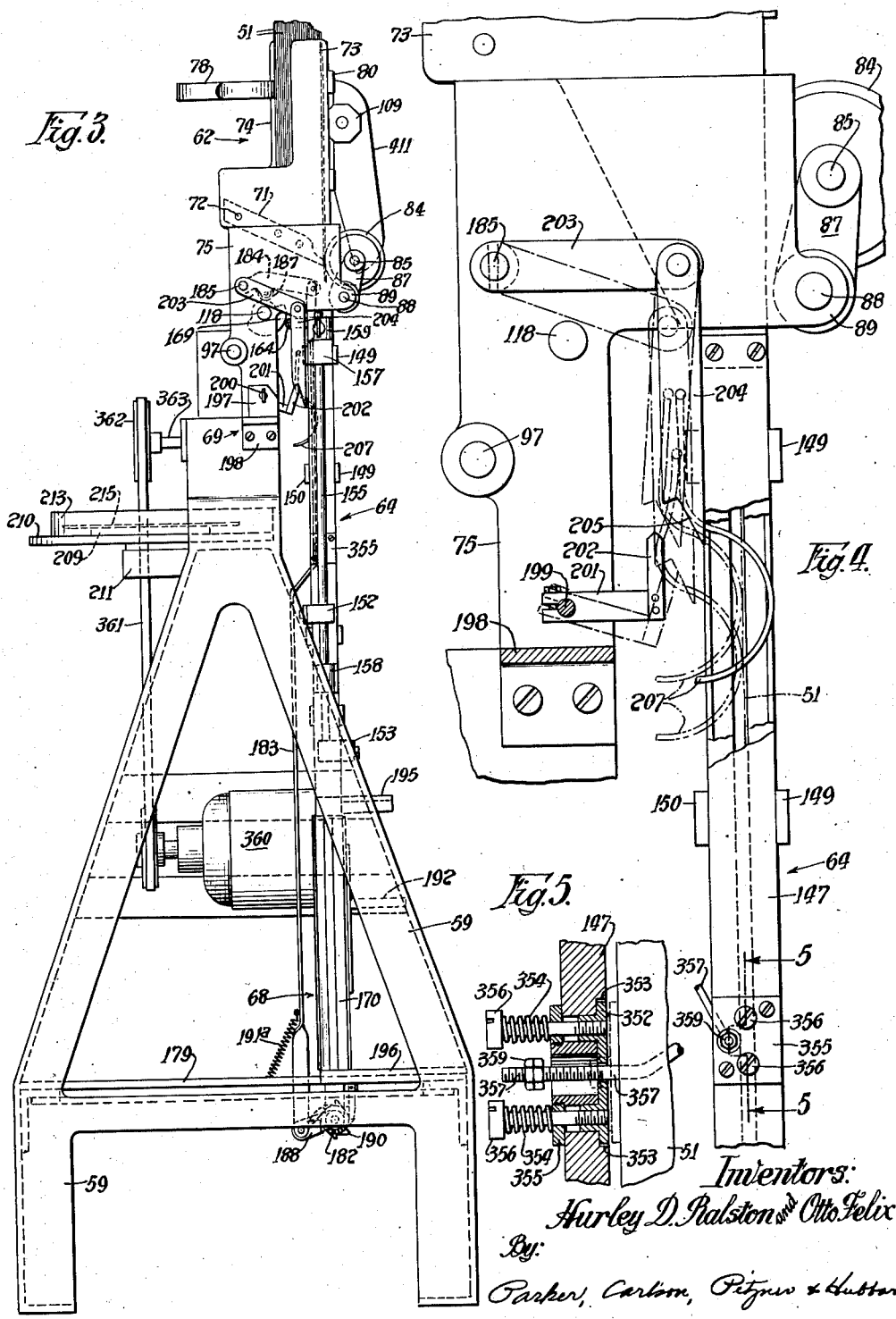

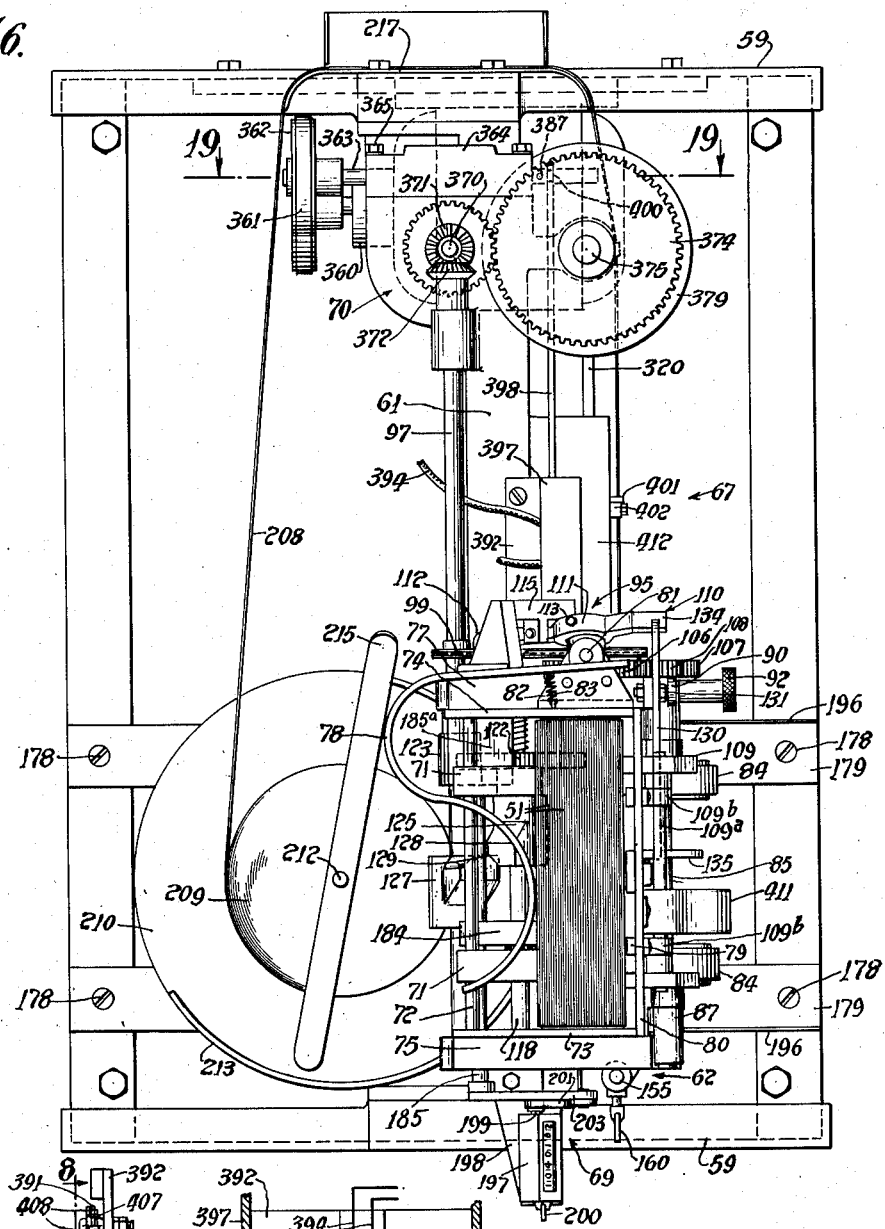

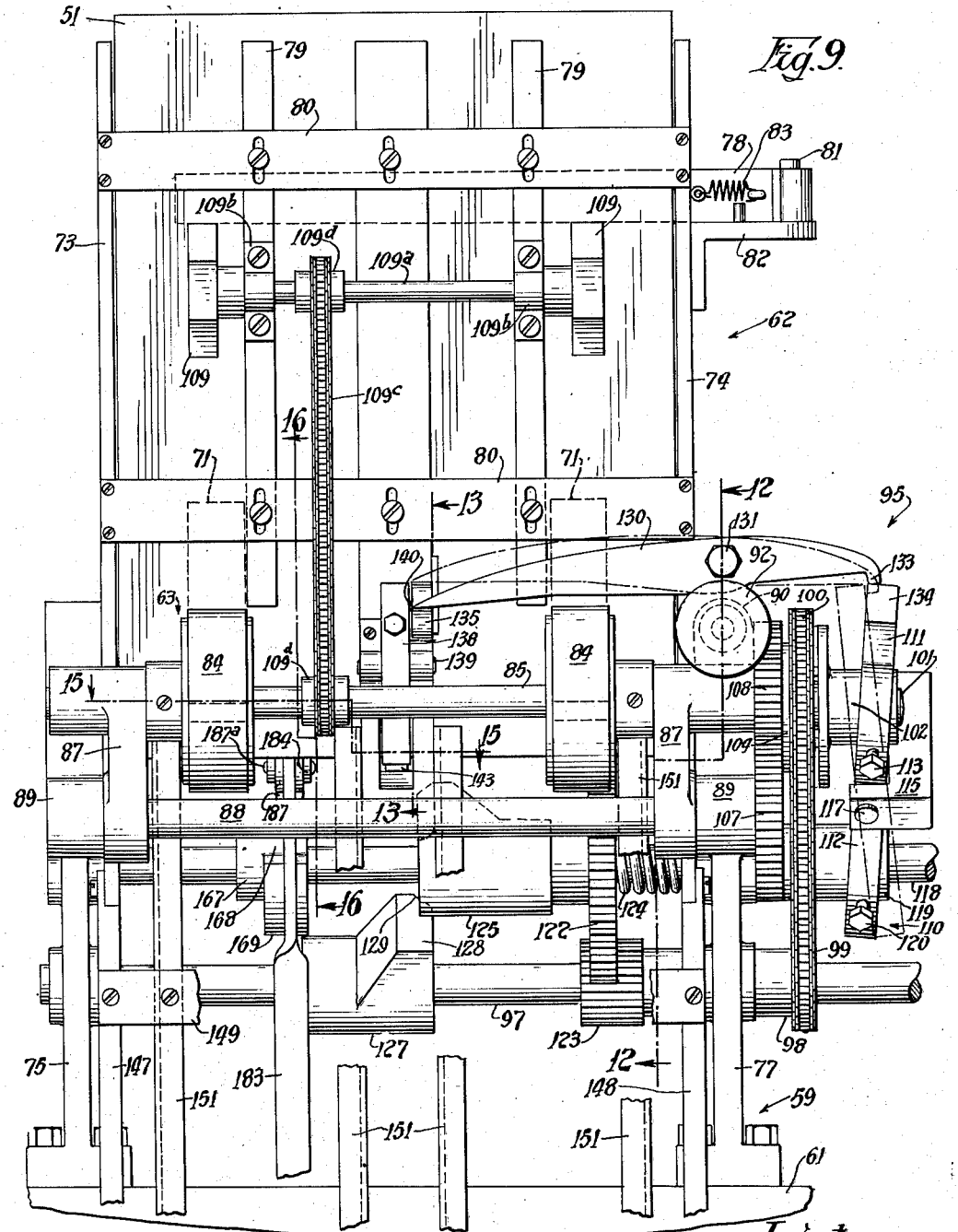

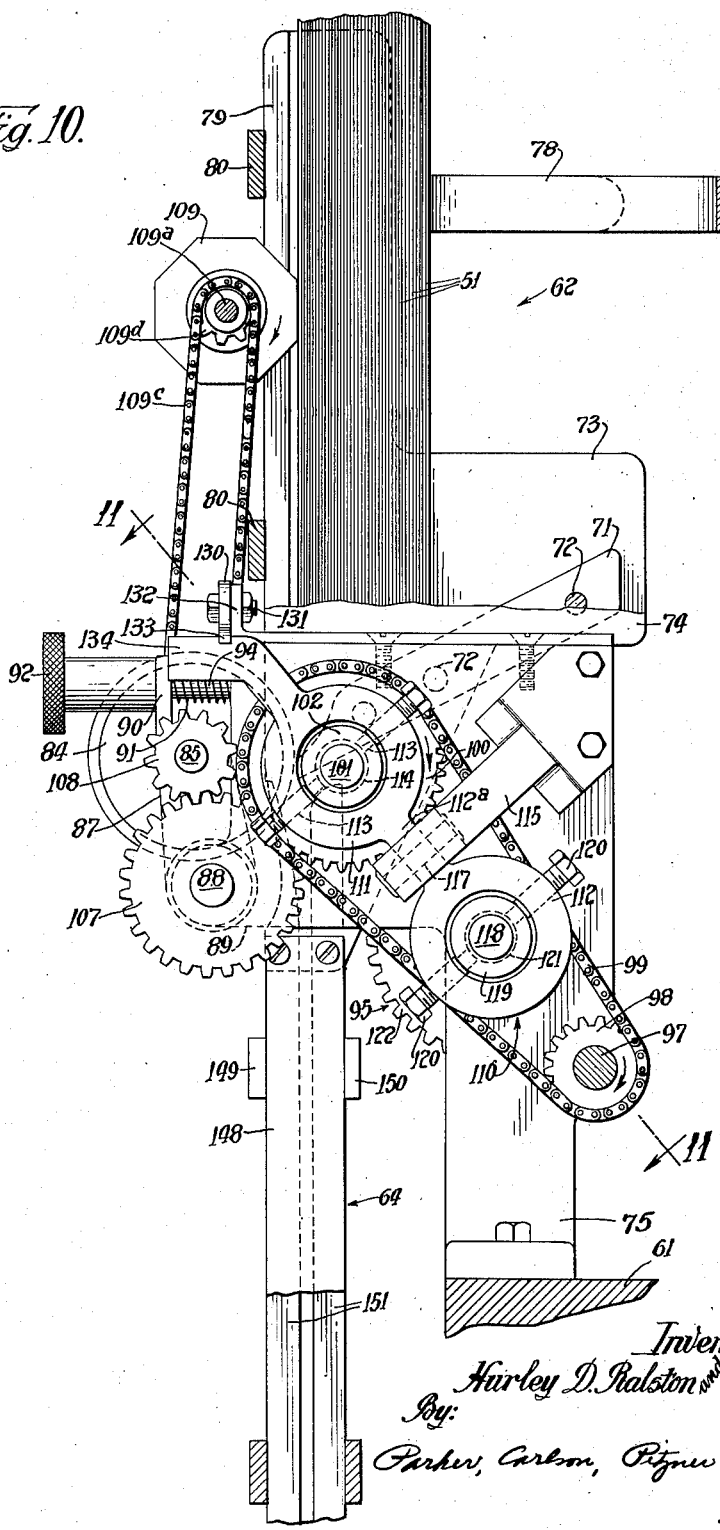

Aug. 12, 1941.  H. D. RALSTON ET AL  2,252,202
METHOD OF AND MEANS FOR PROVIDING LOOSE-LEAF CATALOGUE
OR FILE LEAVES WITH HINGES
Filed March 30, 1938   15 Sheets-Sheet 7
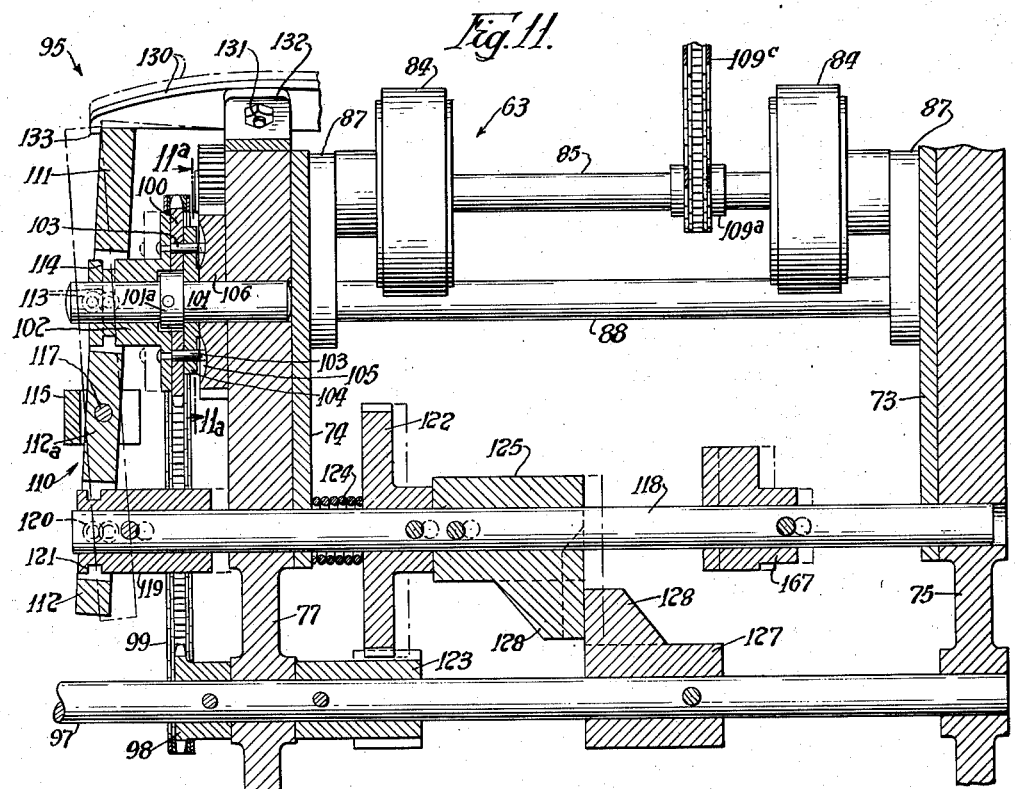
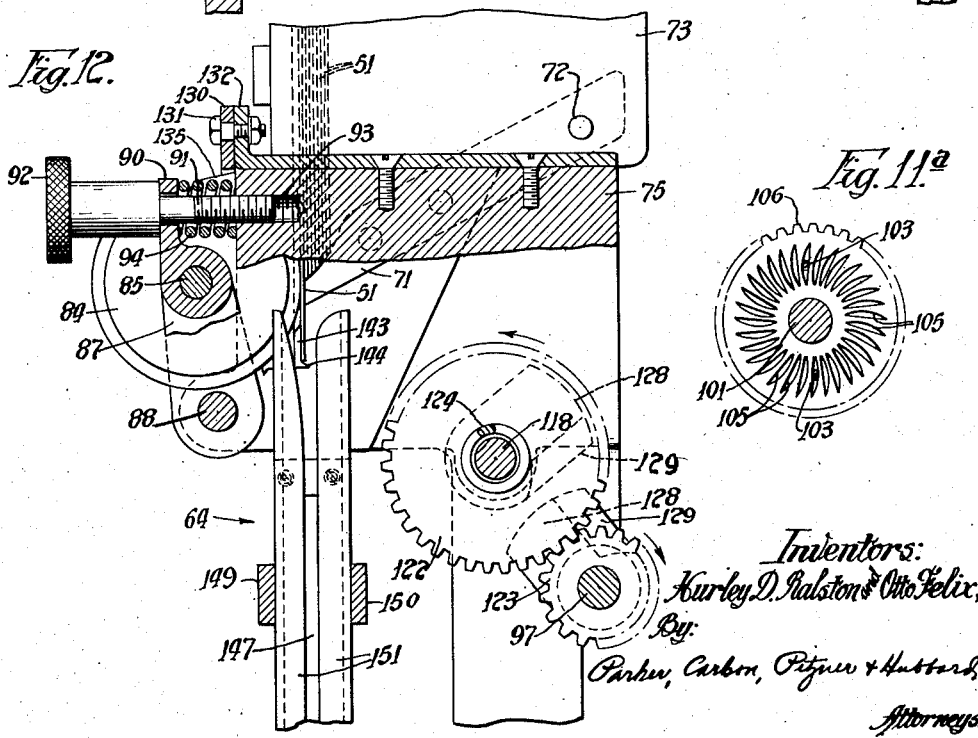

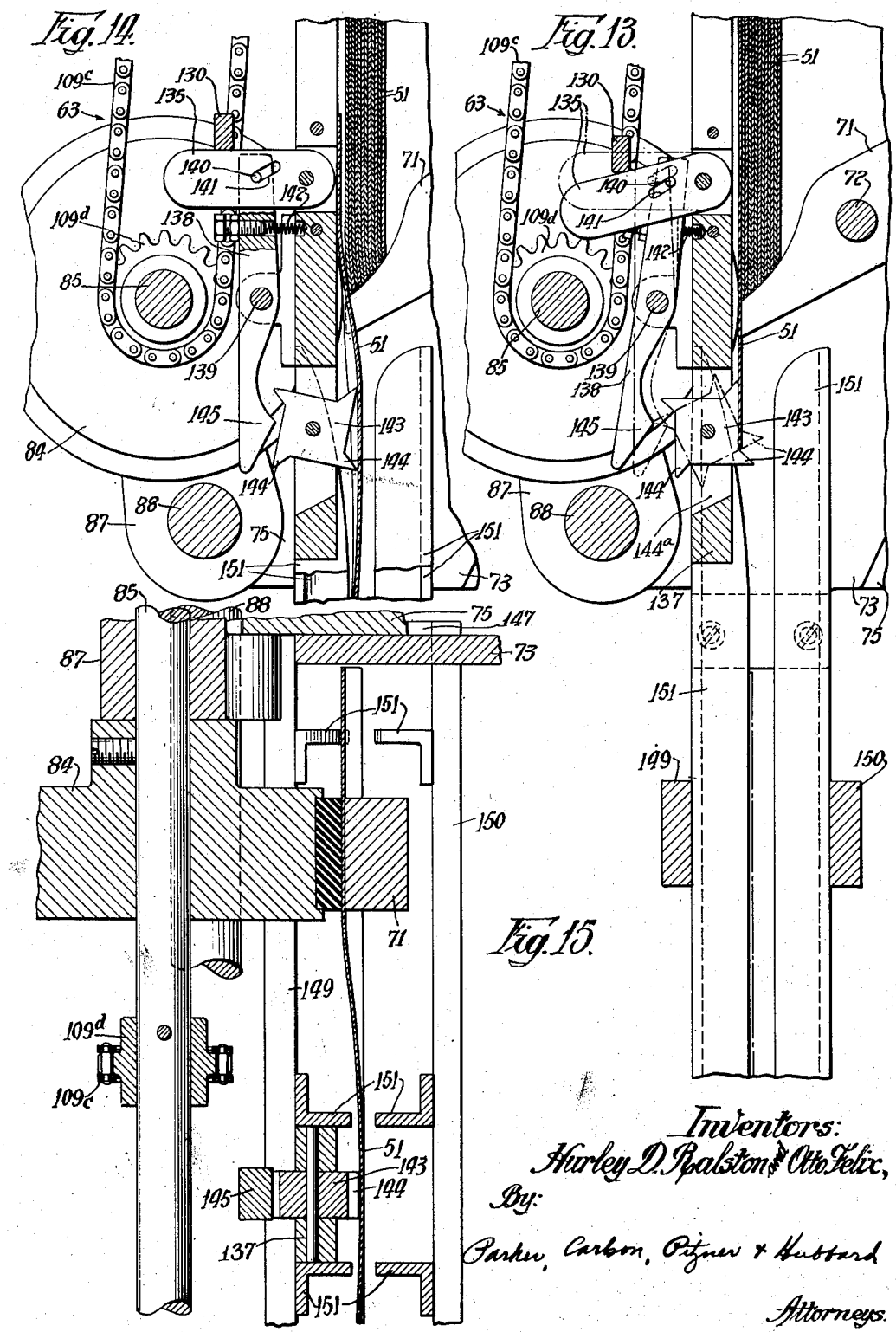

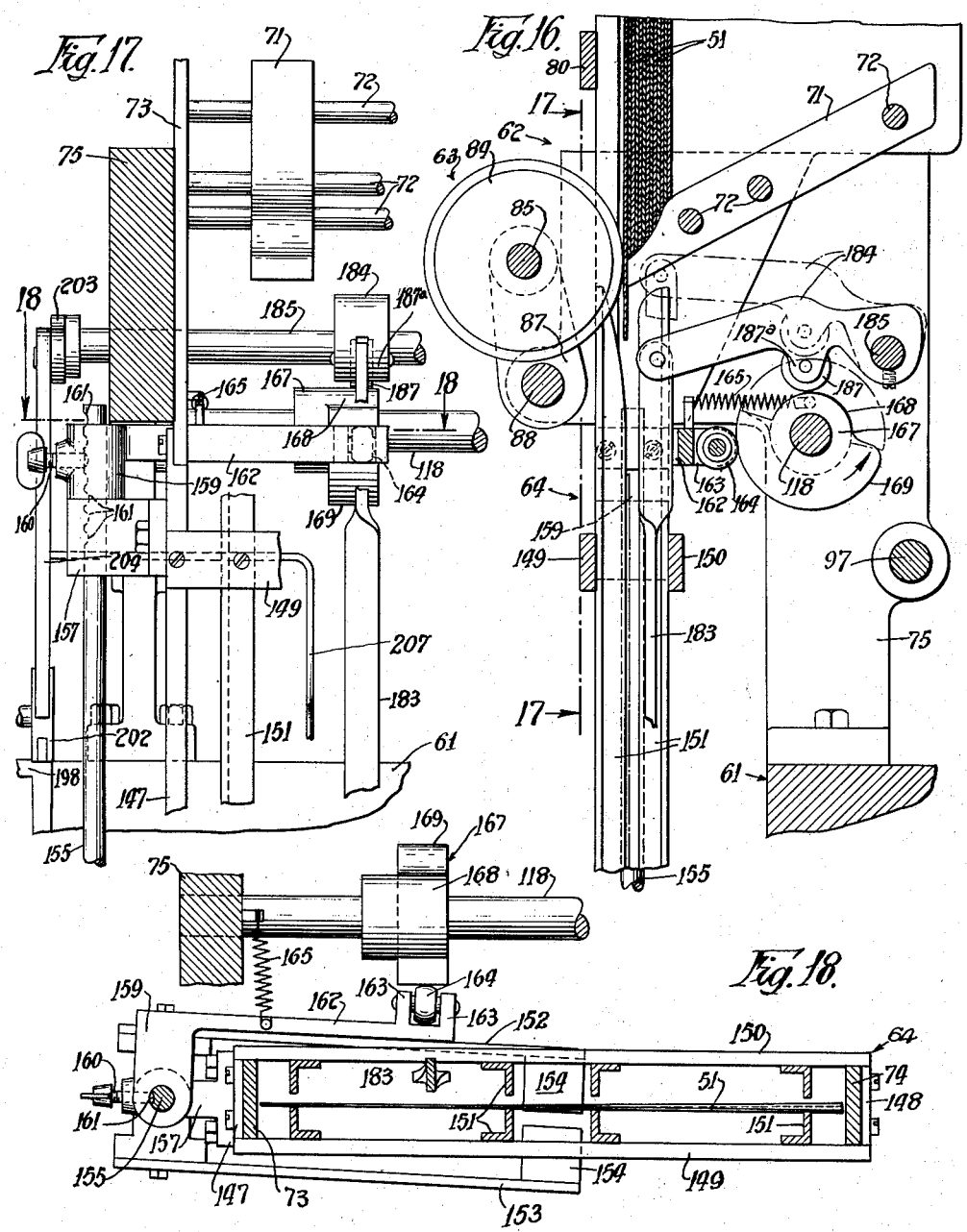

Aug. 12, 1941.    H. D. RALSTON ET AL    2,252,202
METHOD OF AND MEANS FOR PROVIDING LOOSE-LEAF CATALOGUE
OR FILE LEAVES WITH HINGES
Filed March 30, 1938    15 Sheets-Sheet 10
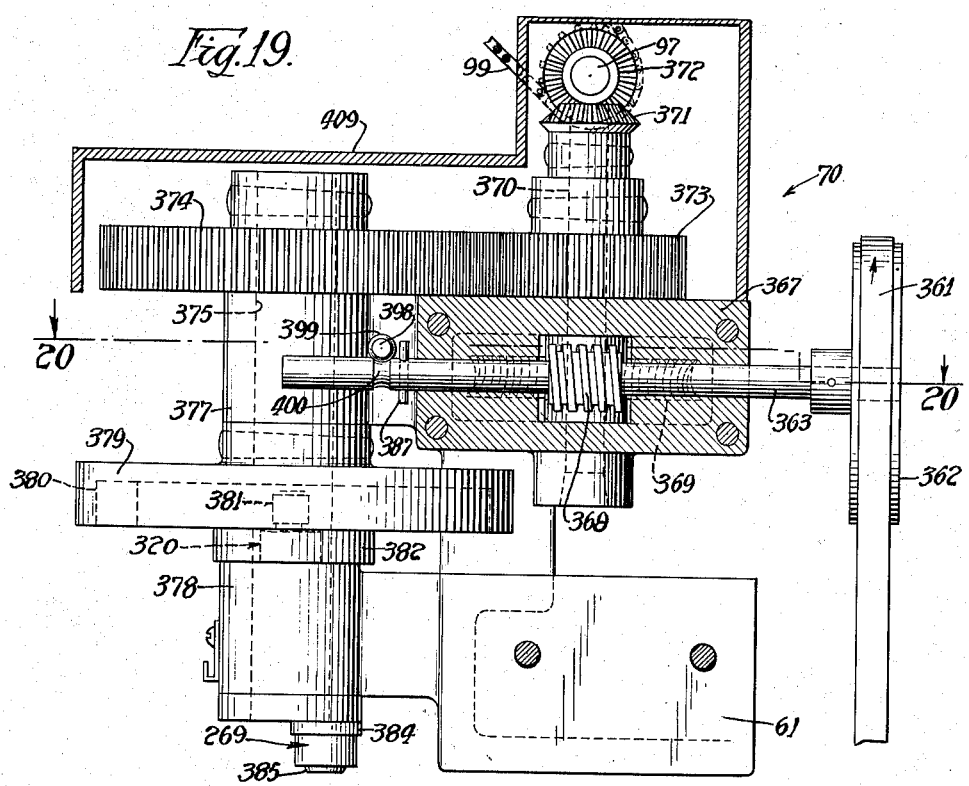
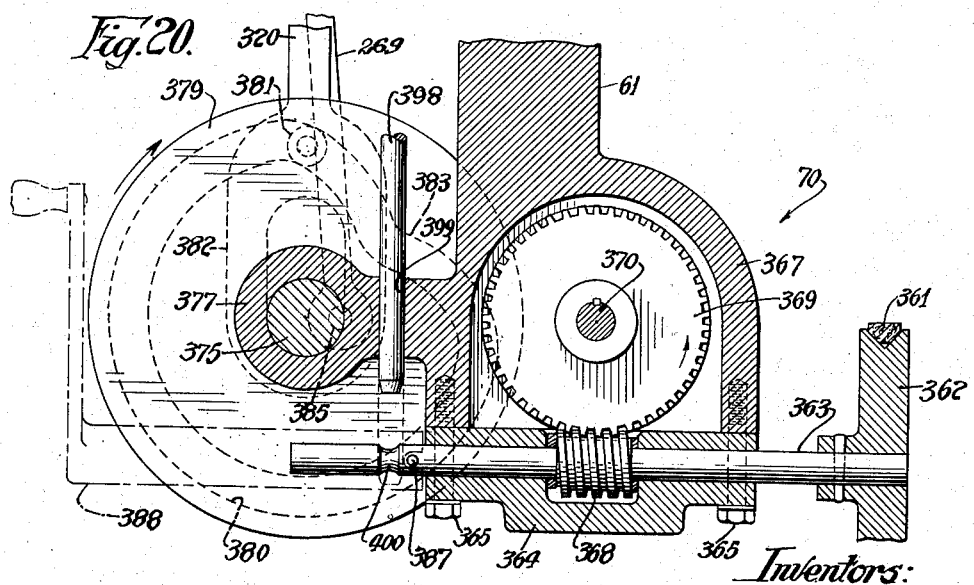
Inventors:
Hurley D. Ralston and Otto Felix,
By: Parker, Carlson, Pitzner & Hubbard
Attorneys.

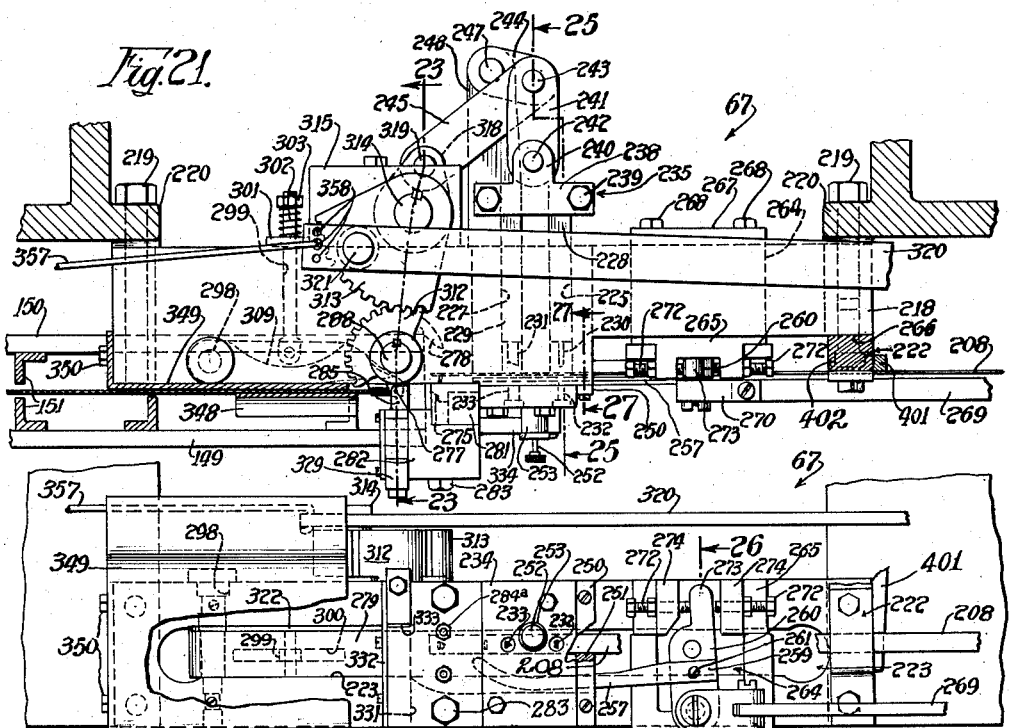

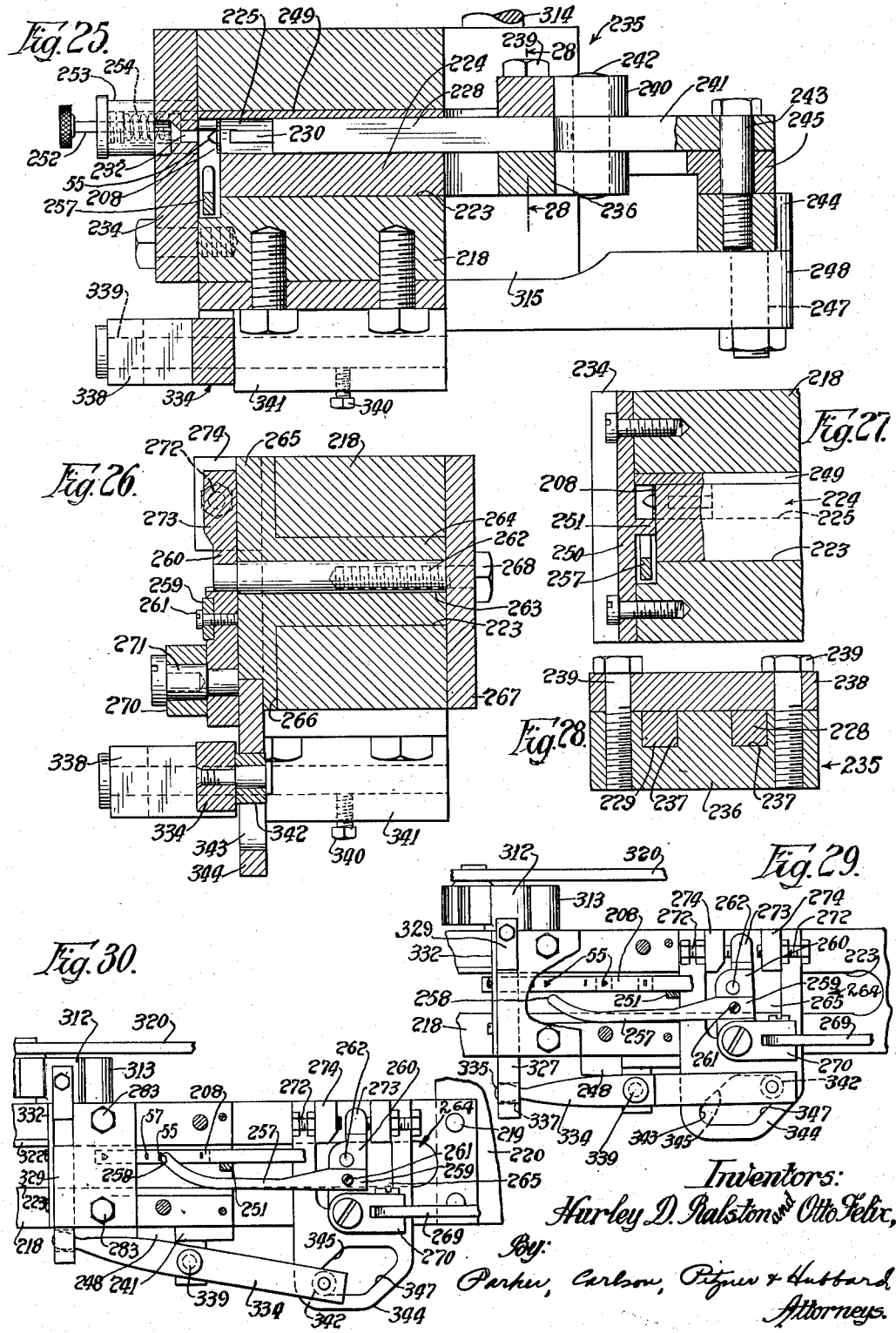

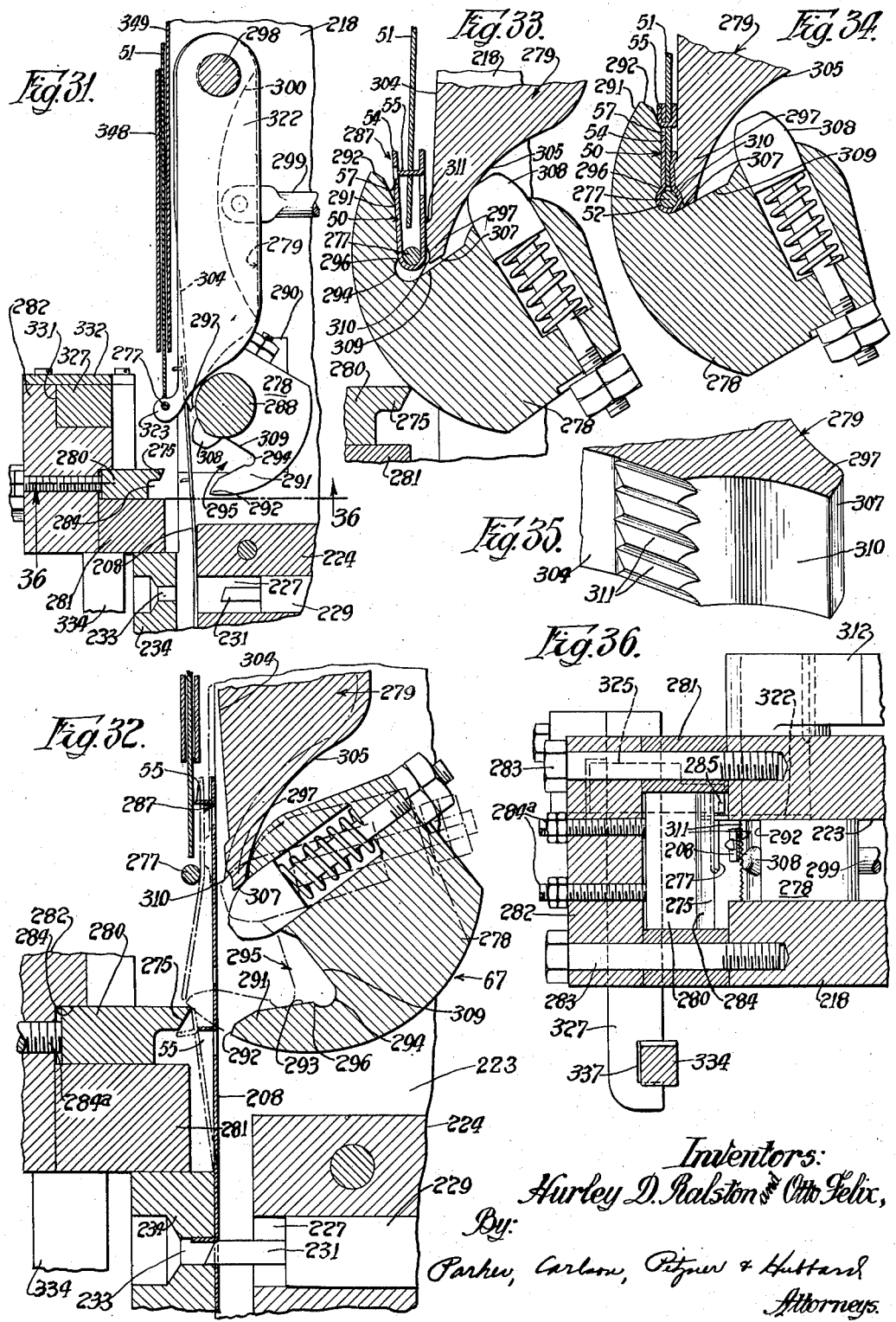

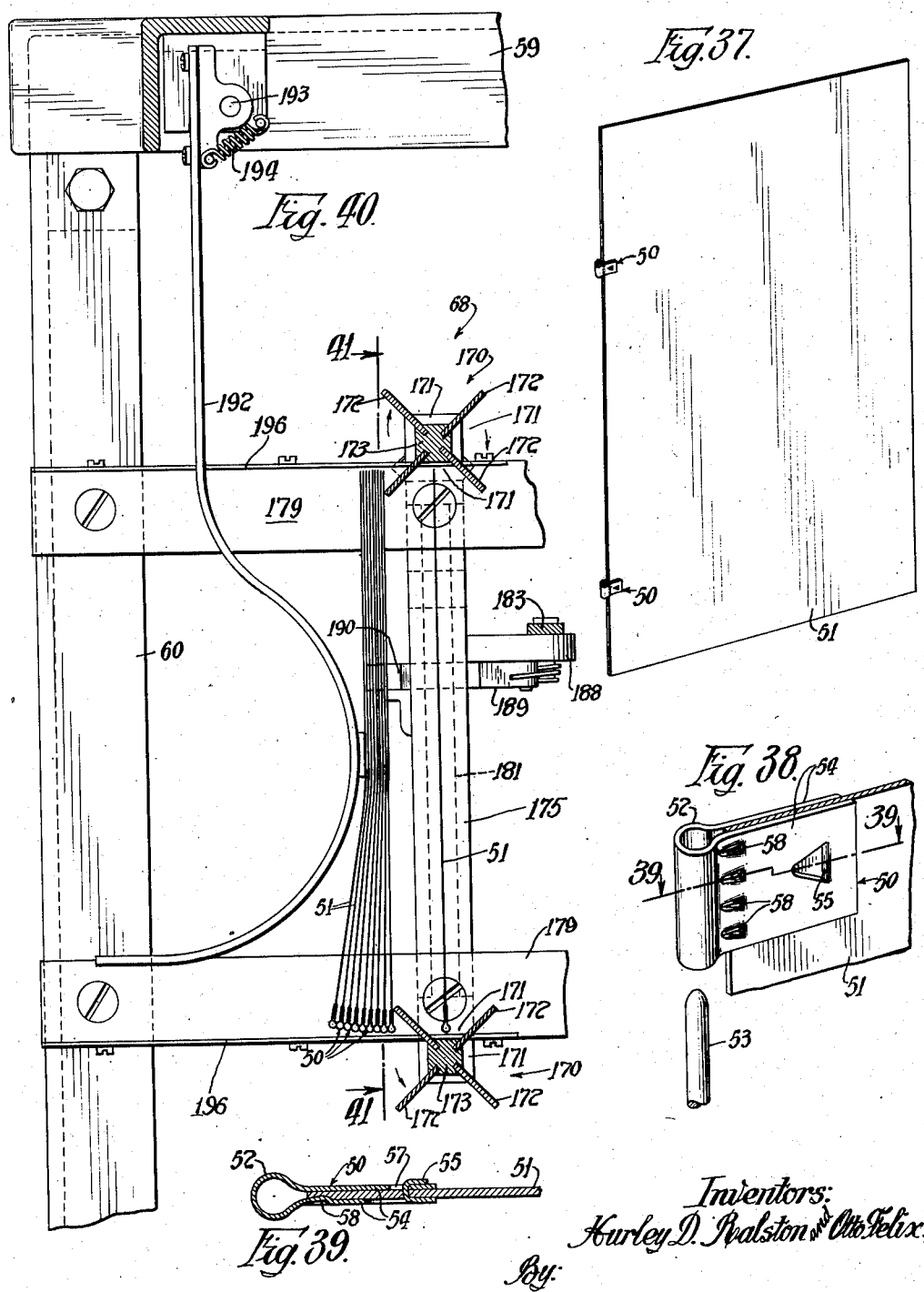

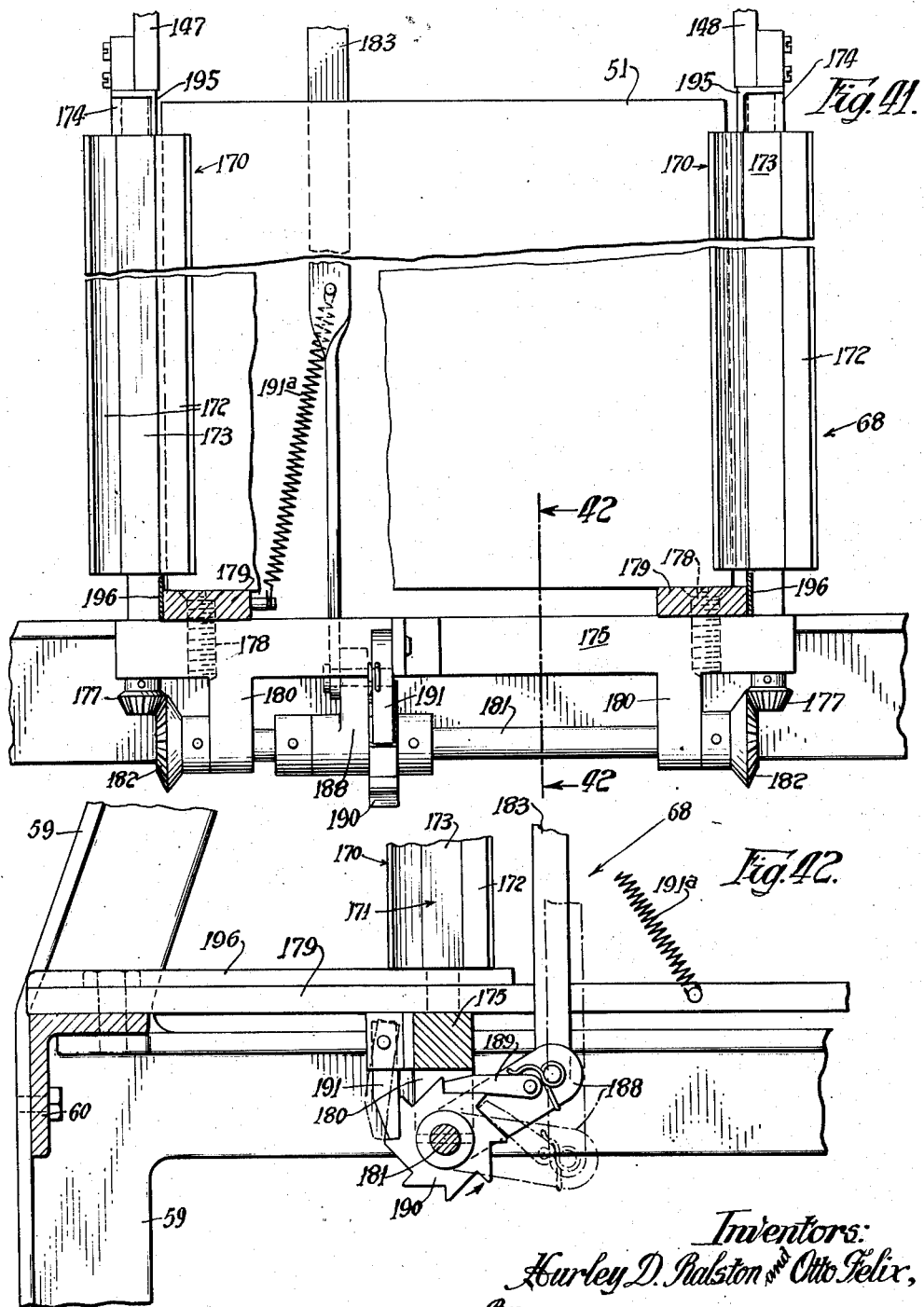

Patented Aug. 12, 1941

2,252,202

UNITED STATES PATENT OFFICE 2,252,202

METHOD OF AND MEANS FOR PROVIDING LOOSE-LEAF CATALOGUE OR FILE LEAVES WITH HINGES

Hurley D. Ralston and Otto Felix, Chicago, Ill., assignors to Sears, Roebuck and Co., Chicago, Ill., a corporation of New York Application March 30, 1938, Serial No. 198,978

44 Claims. (Cl. 1—2)

This invention relates to a novel method of and means for providing loose-leaf catalogue or file leaves with hinges to permit mounting of the leaves swingably upon supporting rods or pintles such as shown in our copending application Serial No. 165,004, filed September 22, 1937, now Patent No. 2,138,848 issued December 6, 1938.

One object of the invention is to provide a novel method of and means for producing the hinges efficiently and inexpensively.

Another object of the invention is to provide such a method and means which will avoid handling of the hinges after they are formed, by affixing the hinges directly onto the margins of the catalogue or file leaves at the time of the hinge forming operation.

Another object resides in the provision of a novel method of and apparatus for rapidly feeding, positioning and applying hinges to a succession of leaves.

Another object is to provide a machine having a novel leaf magazine and mechanism adapted for feeding the leaves from the magazine one-by-one into position to be hinged.

Another object of the invention is to provide a machine having leaf-feeding and hinge applying mechanisms, and means controlled at least in part by the leaves to correlate the operation of such mechanisms.

Another object of the invention is to provide a machine of the present character having a novel leaf counting assembly, the operation of which is governed by the leaves to be counted.

Another object is to provide a leaf-hinging machine including novel means for positioning the successive leaves to be hinged in predetermined relation to the hinge affixing means, and means operatively correlated with the positioning means for stacking the leaves after they have been hinged.

Another object of the invention is to provide a novel hinge forming and applying machine of the foregoing general character having driving means by which all moving parts are actuated in timed sequence in a rapid, continuous, operating cycle.

Another object is to provide a novel driving means of this character which may be either manually or power actuated selectively, and which embodies safety means for preventing accidental power actuation during manual actuation.

Another object of the invention resides in the provision, in a machine of this character wherein the hinges are formed from a continuous strip of suitable material, of means for halting operation of the power driving means when the strip of material comes to an end.

Other objects and advantages will become apparent in the following description and from the accompanying drawings in which:

Fig. 2 is a rear elevational view of the machine.

Fig. 3 is an elevational view of the left side of the machine.

Fig. 4 is an enlarged fragmentary elevational view taken substantially along line 4—4 of Fig. 1 with parts broken away to show the control means for the leaf counting mechanism.

Fig. 5 is an enlarged sectional detail view taken approximately on line 5—5 of Fig. 4 and showing the leaf alining means in detail.

Fig. 6 is a top plan view of the machine.

Fig. 7 is a fragmentary elevational view partially in section taken substantially in the plane of line 7—7 of Fig. 1 to show the control switch of the machine and the automatic shut-off mechanism therefor.

Fig. 8 is a fragmentary front elevational view looking in the direction of plane line 8—8 of Fig. 7 with parts broken away to show the control switch mechanism.

Fig. 9 is an enlarged fragmentary front elevational view of the upper portion of the machine, with certain parts broken away to show the leaf magazine and the leaf feeding mechanism.

Fig. 10 is a fragmentary elevational view partially in section, looking toward the right side of Fig. 9 and showing the driving clutch means of the leaf feeding mechanism.

Fig. 11 is a sectional detail view taken substantially along line 11—11 of Fig. 10 to show the said driving and clutch means in greater detail.

Fig. 11a is a fragmentary sectional elevational view taken substantially in the plane of line 11a—11a of Fig. 11 and shows the tooth face of the clutch gear.

Fig. 12 is a sectional detail view taken substantially along line 12—12 of Fig. 9 to show details of the adjusting means for the leaf-feeding rolls.

Fig. 13 is a sectional detail view taken substantially along line 13—13 of Fig. 9 to show the leaf actuated feed controlling means.

Fig. 14 is a sectional detail view similar to Fig. 13 but showing certain parts in different operative positions.

Fig. 15 is a sectional detail view taken substantially along line 15—15 of Fig. 9 to show how a fed leaf passes the actuating device of the feed controlling device.

Fig. 16 is a sectional detail view in elevation taken substantially along line 16—16 of Fig. 9 to show the operation-controlling cam for the leaf stops and the restacker.

Fig. 17 is a fragmentary sectional view taken substantially in the plane of line 17—17 of Fig. 16 and shows the devices operated by said operation-controlling cam as seen from the front of the machine.

Fig. 18 is a fragmentary sectional plan view taken substantially along line 18—18 of Fig. 17 looking downwardly into the leaf chute and showing the leaf stops and the operating mechanism therefor.

Fig. 19 is an enlarged fragmentary sectional view taken substantially along the line 19—19 of Fig. 6 to show the details of the transmission of the driving mechanism.

Fig. 20 is a fragmentary sectional view taken substantially along line 20—20 of Fig. 19 to show the power drive shaft and its associated safety rod and also the cam disk for the actuating bar of the hinge-forming mechanism.

Fig. 21 is a sectional top plan view of the hinge forming unit taken along line 21—21 of Fig. 1.

Fig. 22 is a front elevational view of the hinge forming unit.

Fig. 23 is an enlarged sectional elevational view taken substantially along the line 23—23 of Fig. 21 and shows the arbor carrier as well as the actuating means for the hinge former.

Fig. 24 is a fragmentary sectional plan view taken in the plane of line 24—24 of Fig. 23 to bring out certain details of the arbor head and its mount.

Fig. 25 is a fragmentary sectional elevational view taken substantially along the line 25—25 of Fig. 21 to show the punch and die mechanism.

Fig. 26 is a sectional view taken substantially in the plane of line 26—26 of Fig. 22 through the reciprocating carriage for the ribbon feeding finger and arbor actuator.

Fig. 27 is a sectional view taken substantially in the plane of line 27—27 of Fig. 21 through the ribbon guide.

Fig. 28 is a sectional view taken in the plane of line 28—28 of Fig. 25 through the punch head.

Fig. 29 is a fragmentary front elevational view showing the ribbon feeding and arbor actuating mechanism, and having certain parts broken away for clarity of illustration.

Fig. 30 is a fragmentary front elevational view similar to Fig. 29 but showing the ribbon feeding and arbor actuating mechanism in a different operative position.

Fig. 31 is a fragmentary sectional plan view taken substantially along line 31—31 of Fig. 23 showing the hinge-forming mechanism in the position assumed before actuation thereof through a forming cycle.

Fig. 32 is an enlarged fragmentary sectional view taken substantially along line 32—32 of Fig. 23 and showing successive preliminary steps in the hinge-forming action of the forming mechanism.

Fig. 33 is a fragmentary sectional plan view taken in the same plane as Fig. 32 but showing the hinge former in the position assumed thereby when the hinge is nearly completed.

Fig. 34 is a fragmentary sectional plan view taken in the same plane as Figs. 32 and 33 and showing the hinge former in the position assumed thereby as the hinge is finished.

Fig. 35 is a fragmentary enlarged sectional perspective view of the forming end of the forming block or table.

Fig. 36 is a fragmentary sectional elevational view taken substantially along line 36—36 of Fig. 31 to show the ribbon cut-off means.

Fig. 37 is a perspective view of a hinged catalogue or file leaf.

Fig. 38 is an enlarged fragmentary perspective view, partly in section, showing a hinge produced according to the present invention, and a pintle to receive the hinge.

Fig. 39 is a sectional view taken substantially along line 39—39 of Fig. 38 through the hinge.

Fig. 40 is a fragmentary sectional plan view taken substantially along line 40—40 of Fig. 2 to show the restacking means of the machine.

Fig. 41 is a fragmental sectional elevational view taken substantially along line 41—41 of Fig. 40 and shows the leaf kick-outs.

Fig. 42 is a fragmentary sectional elevational view taken substantially along line 42—42 of Fig. 41 to show the operating pawl and ratchet mechanisms for the kick-outs.

Figure 1:
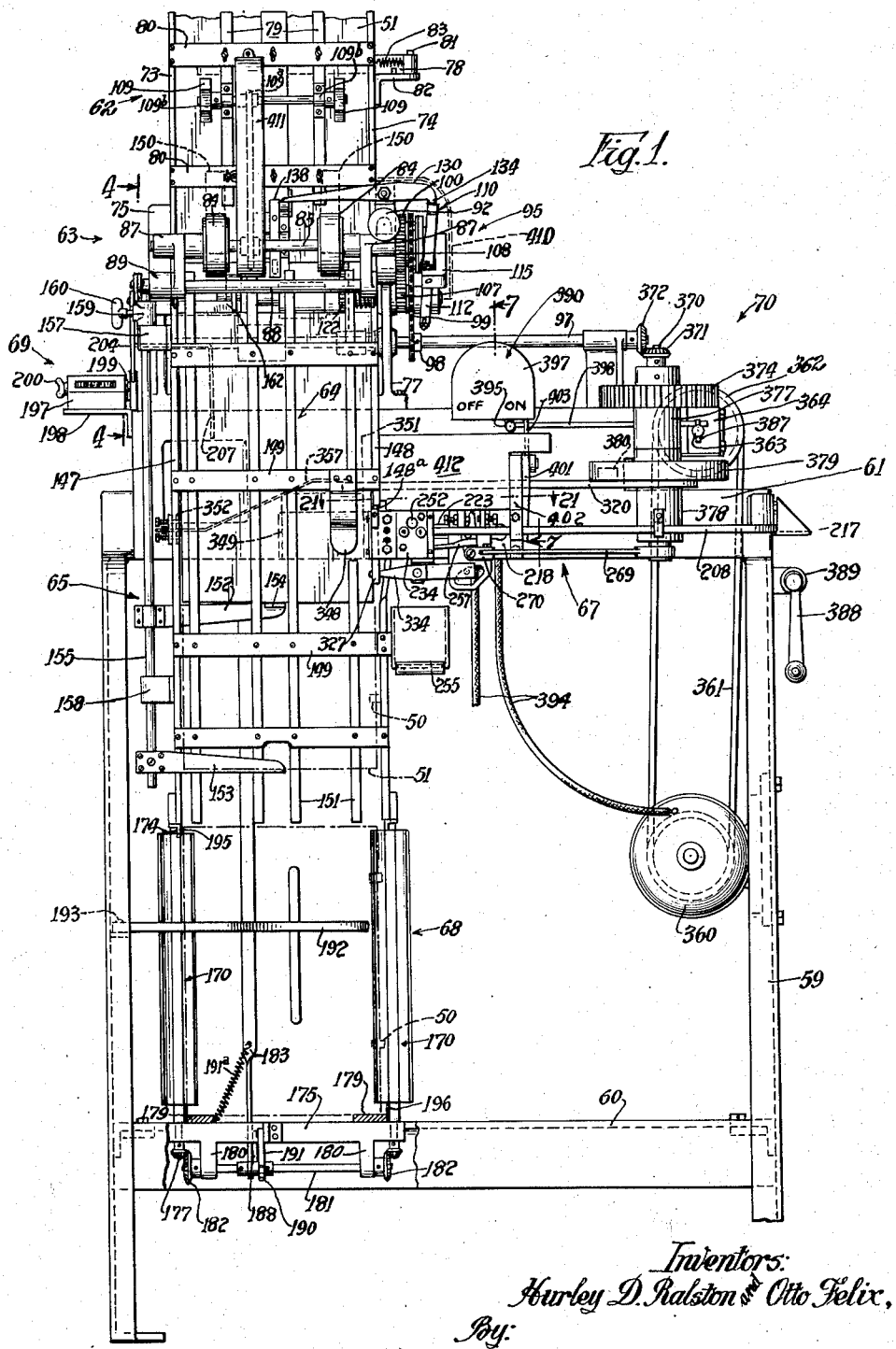
Figure 1 is a front elevational view of a machine embodying the present invention.

While the invention is susceptible of various modifications and alternative constructions, we have shown in the drawings and will herein describe in detail, a preferred embodiment, but it is to be understood that we do not thereby intend to limit the invention to the specific form disclosed, but intend to cover all modifications and alternative constructions falling within the spirit and scope of the invention as expressed in the appended claims.

According to the present invention, the novel method of providing loose-leaf catalogue or file leaves with hinges includes the steps of properly positioning successively a series of leaves to be hinged, forming and applying the hinges, and stacking the hinged leaves. To practice these steps of the method as well as certain desirable additional steps, a novel self-feeding machine is provided wherein the leaves to be hinged are placed as a stack into a magazine and are consecutively fed therefrom to a forming mechanism where hinges are produced and applied to selected margins of the leaves as a continuous operation. After being hinged, the leaves are automatically restacked. A record is kept automatically of the total number of leaves that are hinged. Moreover, all of the operations performed by the machine are preferably correlated to take place in timed sequence in a continuous operating cycle.

The machine illustrated in the drawings is particularly adapted for making and affixing hinges 50, of the type shown in Figs. 38 and 39, to the margin of a leaf 51 (Fig. 37). Such leaf may, for example, be in the form of a suitably dimensioned, thin manila card adapted for use in an upright catalogue or file of the kind described in our copending application Serial No. 165,004 filed September 22, 1937, now Patent No. 2,138,848. There are, of course, other types of leaves for a variety of uses which may be hinged in accordance with this invention. Among the devices in which such leaves may be used may be mentioned albums, sorting devices, special files and indexes, and the like.

In the present instance, each of the hinges 50 includes a sleeve-like yoke 52 which is of suitable internal diameter to receive an annular supporting rod or pintle 53. The yoke 52 connects the ends of a pair of elongated flat legs 54 which clamp the selected margin of the leaf 51 therebetween and are secured together in clamping relation to the margin of the leaf by a prong 55 (Fig. 39). The prong is struck inwardly from the inner end portion of one of the legs 54 and passes through the leaf and through an aperture 57 in the opposite hinge leg 54 against the outer face of which it is bent. For holding the hinge substantially against movement longitudinally of the leaf edge, suitable means such as a plurality of spaced, parallel indentations or crimps 58 may be formed to project inwardly from one of the hinge legs 54. These crimps may extend at right angles to the axis of the yoke 52 and bite into the extreme edge portion of the leaf margin.

General description of the machine

Figure 2:
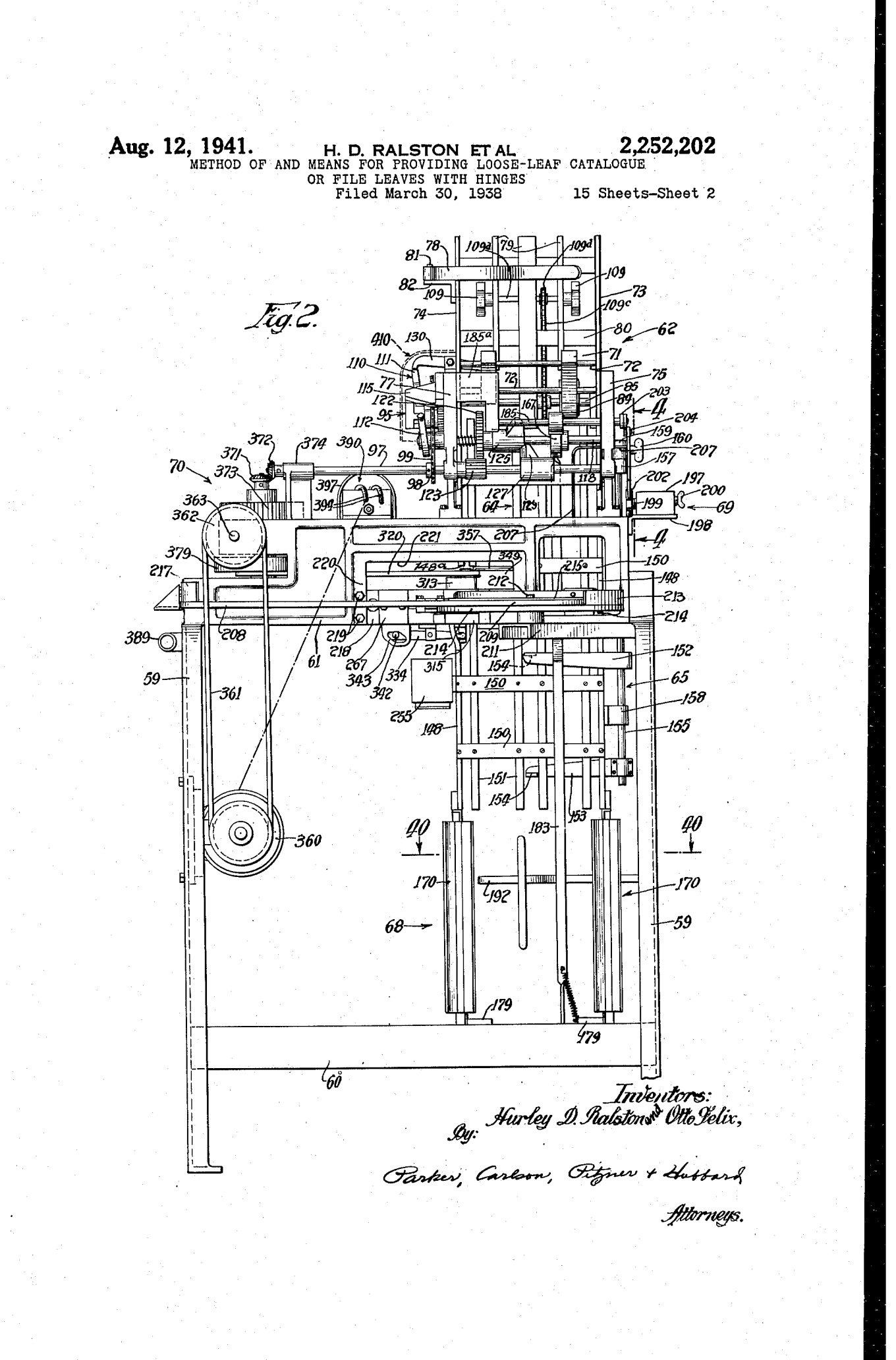

As shown generally in Figs. 1, 2 and 3, the machine is constructed upon a suitable upright base or framework 59 which includes lower connecting bars 60. Carried by the upper part of this framework is a main supporting member or bed 61. Mounted upon the bed 61 is a hopper or magazine 62 for receiving a stack of the leaves 51 to be hinged. From the magazine the leaves 51 are consecutively fed by suitable mechanism, indicated generally at 63, downwardly into an appropriately alined vertical slideway or chute 64 (see also Figs. 10 and 12). At an intermediate point in their passage through the chute 64, the leaves 51 are halted by suitable stop means, indicated generally by the numeral 65, and are there supplied with the hinges 50 by hinge forming and applying mechanism indicated generally at 67. After the leaves 51 have been hinged they are released from the stop mechanism 65 and pass from the chute 64 to a kick-out mechanism indicated generally at 68 which restacks the hinged leaves for removal from the machine. While the leaves 51 are passing through the machine they are automatically counted by a suitable recording device 69. Actuation of the machine is effected in a continuous operating cycle by a suitable power source acting through drive mechanism which is indicated generally at 70.

Leaf magazine construction

In the magazine 62, (Figs. 1, 6, 10 and 12) the leaves 51 are supported vertically on edge and face forwardly so that the foremost leaf of the stack may be fed downwardly directly into the mouth of the chute 64. For this purpose, the leaves 51 rest edgewise upon forwardly inclined, parallel supporting bars 71 which are mounted by means of suitable anchor bars or rods 72 between the lower end portions of a pair of vertical side plates 73 and 74. The latter are supported by a pair of spaced vertical standards 75 and 77, respectively, which are bolted to the upper face of the main bed 61.

A curved pusher arm 78 (Figs. 2, 6 and 10) bears against the rear of the stack of leaves 51 to urge the leaves forwardly against retaining means including a plurality of spaced, parallel vertical bars 79 which are supported for vertical adjustment by crossbars 80 attached at their ends to the side plates 73 and 74. The pusher arm 78 may be pivotally mounted at its outer end upon an upright pivot pin 81 on a bracket 82 secured to the side plate 74. A spring 83 maintains the pusher arm 78 under resilient tension.

Leaf feeding mechanism

At their forward ends, the leaf supporting bars 71 (Figs. 9, 10, 11 and 12) of the magazine 62 are constructed to coact with the peripheries of suitable rubber-tired feed rollers 84 which form part of the leaf feeding mechanism 63. This arrangement is such that the leaves 51 will be yieldingly gripped and positively fed consecutively past the forward edges of the inclined leaf supporting bars 71 into the chute 64.

In order to permit accurate adjustment of the feed rollers 84 relative to the coacting ends of the leaf supporting bars 71, the rollers are mounted upon a shaft 85 which is journaled at its opposite ends in a pair of rocker brackets 87. These brackets are pivotally supported by a shaft 88 (Fig. 9). The ends of the shaft 88 are mounted in parallel, forwardly projecting bearing bosses 89 upon the standards 75 and 77.

One of the rocker brackets 87 has a longitudinally projecting, flattened tongue 90 (Fig. 12) which is apertured to receive the reduced shank portion 91 of a headed adjustment screw 92. The end of the reduced shank portion 91 is threaded into a suitable bore 93 near the upper forward end of the associated standard, herein the standard 77. A compression spring 94 presses the tongue 90 against the end of the larger-diameter portion of the screw 92 and creates a frictional tension for maintaining any adjusted position of the adjustment screw. Thus, adjustment of the feed rollers 84 toward or away from the coacting ends of the leaf supporting bars 71 is easily effected by turning the adjustment screw 92.

The feed roller shaft 85 is driven through the medium of suitable clutch mechanism, indicated generally at 95 (Figs. 9, 10 and 11), from a drive shaft 97. As shown, a sprocket 98 on the drive shaft 97 actuates a sprocket chain 99 which engages a driven sprocket 100 mounted upon a stud shaft 101 and is retained thereon by a collar 101a. The stud shaft is fixedly secured near the upper end of the standard 77. Coaxially mounted between the outer end of the stud shaft 101 and the collar 101a is a freely rotatable and axially slidable hub 102. Clutch pins 103 rigid with the hub 102 project slidably through the sprocket 100 and a spacer plate 104. These pins are adapted to engage with an annular series of clutch teeth 105 formed on the adjacent face of an idler gear 106 which is also carried by the stud shaft 101 (Figs. 11 and 11a).

The idler gear 106 meshes with a transmission gear 107 which is mounted upon the end of the pivot shaft 88. A pinion 108 rigid with the feed roller shaft 85 meshes with the transmission gear 107. Thus, when the clutch pins 103 are in engagement with the clutch teeth 105, power is transmitted by the sprocket chain 99 through the chain of gears and pinions 100, 106, 107 and 108 to drive the feed roller shaft 85.

Rotation of the feed roller shaft 85 is also utilized to drive a pair of agitator wheels 109 (Figs. 9 and 10). The wheels are preferably non-circular and are mounted upon the ends of a carrying shaft 109a to project peripherally into engagement with the stack of leaves 51 in the leaf magazine 62. Suitable bearings 109b support the shaft 109a and are secured to two outer ones of the front bars 79 of the leaf magazine.

A driving connection between the agitator shaft 109a and the feed roller shaft 85 is effected by a sprocket chain 109c running over a sprocket 109ᵈ on each of the shafts. This sprocket chain may be tightened after assembly by vertically adjusting the respective supporting front bars 79 which support the shaft 109ᵃ. As the feed roller shaft 85 rotates it drives the agitators, which, due to their non-circular shape, vibrate and loosen the leaves in the stack, thereby facilitating the leaf feeding operation.

In order to correlate actuation of the feed rollers 84 with the operation of the hinge forming and applying mechanism 67, the stop mechanism 65 and the kick-out mechanism 68, the clutch mechanism 95 (Figs. 1, 9 and 11) is operatively controlled for effecting engagement and disengagement of the clutch pins 103 and the clutch teeth 105 in timed sequence. To this end, the clutch is provided with means such as a substantially spectacle-shaped actuator 110 for sliding the hub 102 axially upon the stud shaft 101. The actuator 110 includes upper and lower annular rims 111 and 112, respectively, connected by a web 112ᵃ. The rim 111 coaxially surrounds the hub 102 and is connected thereto by means of radial pins 113 which ride in a circumferential groove 114 in the hub.

By connecting the web 112ᵃ (Figs. 9 and 11) pivotally to a suitable supporting bracket 115 as by means of a pin 117, it is possible by swinging the rim 112 to and fro in an axial direction to actuate the rim 111 for sliding the hub 102 longitudinally of the stud shaft 101 and thus move the pins 103 into clutching or declutching relation to the clutch teeth 105. Such axial movement of the rim 112 is effected herein by an axially movable shaft 118 which is journaled in the standards 75 and 77 in adjacent, spaced parallel relation to the drive shaft 97. A collar 119 is rigidly connected to the clutch end of the shaft 118 and extends substantially concentrically through the rim 112. Connecting pins 120 are threaded radially through the rim 112 to ride in an annular groove 121 in the collar 119.

A driven gear 122 fast upon the shaft 118 meshes with a driving pinion 123 on the drive shaft 97. Coaxial with the shaft 118 between the face of the driven pinion 122 and the opposite face of the lower portion of the magazine side plate 74 is a compression spring 124 which normally urges the shaft 118 axially toward the right as seen in Fig. 11 or toward the left as seen in Fig. 9. Thus, under the influence of the spring 124, the shaft 118 will hold the clutch actuator 110 in the declutching position, as indicated in full outline in Fig. 9 and in broken outline in Fig. 11.

Rigidly secured to the driven shaft 118 and to the drive shaft 97 is a pair of similar, intermittently coactive cam members 125 and 127, respectively Each of these cam members is provided with a projecting nose portion 128 which has a cam face 129 disposed to enter into engagement with the cam face of the other cam member. These cam members 125 and 127 are so relatively located that the cam faces 129 will collide at regularly timed intervals in the rotation of the shafts 97 and 118 and force the driven shaft 118 axially in opposition to the compression spring 124 a sufficient distance to shift the clutch actuator 110 into clutching position as indicated in the full line position in Fig. 11 and in broken outline in Figs. 1 and 9. In the present instance it has been found desirable to effect engagement between the cam members 125 and 127 once in every four revolutions of the drive shaft 97, governed by a four to one ratio between the pinions 123 and 122, respectively.

Since in the present instance the cam members 125 and 127 are in engagement for only a short interval sufficient to initiate operation of the clutch, means should be provided for maintaining the clutch in the operative condition until one of the leaves 51 shall have been fed entirely from the magazine 62. Such means may include a pivoted latch arm 130 which is in the form of an eccentric lever secured by a pivot pin 131 to an ear 132 at the upper end of the standard 77 (Figs. 9, 10 and 11). The outer or shorter end of the latch arm 130 has a depending heel 133 which in the inoperative condition of the clutch rides upon the upper face of a latch finger 134 extending rigidly horizontally from the clutch rim 111. In the operative condition of the clutch, the inner edge of the heel 133 hooks over the outer face of the latch finger 134, and thus holds the clutch member 110 against the pressure of the spring 124 until released by pivoting the latch arm 130.

In the operation of the machine it is important that the clutch mechanism 95 be released instantly to stop the feed rollers 84 after the leaf 51 has been fed to the delivery chute 64. Means is accordingly provided which will hold the latch arm 130 in balance during the operative condition of the clutch mechanism, but which will cause the inner and heavier end of the latch arm to overbalance for releasing the heel 133 from the latch finger 134 after the leaf 51 has been fed to the chute. Herein the inner end of the latch arm 130 (Figs. 9, 13, and 14) coacts with novel trigger mechanism, which includes a rest 135 underlying said inner end. The rest 135 projects forwardly from and is suitably pivotally supported at its rear end on a horizontal axis by appropriate means 137 herein conveniently comprising the lower end of the center vertically adjustable front bar 79 of the leaf magazine (Figs. 13 and 14).

The horizontal position of the rest 135 is maintained by a coactive upright trigger arm 138 which is intermediately pivotally mounted therebelow as at 139. A lateral pin 140 near the upper end of the trigger arm fits into a forwardly inclined diagonal cam slot 141 in the rest 135. The cam slot 141 is of such length and pitch that when the upper end of the trigger arm 138 moves rearwardly, the pin 140 rides up the slot to cause the rest 135 to swing down and drop the inner, heavier end of the latch arm 130.

Appropriate trigger-conditioning means such as an adjustably tensioned compression spring 142 normally tends to urge the upper end of the trigger arm 138 forwardly. As a result, the pin 140 will tend to cam toward the lower end of the slot 141, to swing the rest 135 to its horizontal position. The spring 142 is so adjusted that it just maintains a balanced relationship of the parts during operation of the clutch and will be overcome by only relatively slight force in addition to the weight of the rest 135 and the arm 130.

Means actuated by the fed leaves 51 themselves is provided for periodically springing the trigger mechanism, that is, for pivoting the trigger arm 138 to drop the rest 135 and overbalance the latch arm 130. In the present instance this means includes a trigger-release spur wheel 143 having a plurality of equally spaced, identical spurs 144. The spur wheel 143 is rotatably mounted within a vertical slot 144ᵃ in the lower part of the supporting means 137 and in the pivotal plane of the trigger arm 138. The spurs 144 are adapted to project into the path of the leaves 51 as they pass from the outlet of the magazine 62. As a result, the spur wheel 143 will be rotated by engagement of the spurs 144 consecutively by the fed leaves 51 to cause others of the spurs 144 to kick against a peaked cam heel 145 near the lower end of the trigger arm 138 and pivot the trigger arm. As each spur wheel kicks the trigger arm over, the leaf-feeding mechanism 63 will come to a halt, and the edge of the leaf which caused the halt will remain adjacent to the spur 144 which is engaged in effecting this result.

A complete cycle of operation of the trigger mechanism may be described thus: Assume that the clutch 95 has just been actuated by clashing of the cams 125 and 127 to cause axial shifting of the shaft 118 and thereby pivoting of the actuator 110 to throw the clutch pins 103 into engagement with the clutch teeth 105 whereby to start the feeding operation. The leaf 51 next to be fed will start from the position indicated in the full outline in Fig. 13 and move past the spur wheel 143. As the leaf advances, its forward edge slides past the spur 144 which it previously engaged in releasing the clutch. Simultaneously the next succeeding spur is advanced slightly and presses against the face of the leaf, the leaf flexing slightly at the center to clear the two spurs (full outline positions of Figs. 14 and 15).

As soon as the trailing end of the leaf 51 passes the uppermost of the contacting spurs 144, the latter receives the advancing edge of the following leaf 51 which pushes thereagainst to rotate the spur wheel 143 and urge the spur 144 nearest the cam heel 145 thereagainst (broken outline Fig. 13) with sufficient force to overcome the tension of the spring 142. This pivots the trigger arm 138, cams the rest 135 down and drops the inner eccentric end of the latch arm 130, thus raising the outer short end thereof and releasing the heel 133 from the latch finger 134 to release the clutch mechanism (full line positions of Figs. 9 and 13). After the heel-engaging spur has passed the peak of the heel 145, the trigger mechanism is reconditioned under the influence of the compression spring 142.

Leaf chute

Herein, the chute 64 which receives the leaves 51 as they are fed from the magazine 62 comprises an open-work frame which is suspended below the magazine (Figs. 1, 2, 15 and 18). Such frame includes side bars 147 and 148 which are rabbeted at their upper ends to engage the lower edges of the magazine side plates 73 and 74, respectively, substantially in continuation of the inner face planes of the latter. Connecting the side frame bars 147 and 148 are a plurality of spaced, parallel, horizontal pairs of front and rear connecting bars 149 and 150, respectively. Supported by the connecting bars are front and rear series of opposed vertical guide bars 151 which, in the present instance, are of L-shaped cross section and provide a sufficient space therebetween to afford substantial clearance for the free passage of a leaf. The upper ends of the guide bars 151 are preferably tapered or rounded to form the mouth of the chute.

The side bar 148 is interrupted intermediate its ends by a cut-away portion providing an opening 148ª (Figs. 1 and 2) in the chute to accommodate the hinge forming and applying mechanism 67. Moreover, the lower portion of the side bar 148 is spaced from the opposite side frame bar 147 slightly more than between the upper portions of these bars so as to provide sufficient clearance for the passage of the leaves 51 after the same have been provided with the hinges 50. At their lower ends, the side frame bars 147 and 148 are anchored to the restacking mechanism 68, as will be hereinafter more fully described.

Leaf stop mechanism

In the chute 64, the leaves 51 are halted by the stop mechanism 65 to locate the selected margin of each leaf in position to receive the hinges 50 from the hinge forming and applying mechanism 67 at one or more intermediate points of such margin. As best seen in Figs. 1, 2, 3, and 18, the stop mechanism in the present instance comprises a pair of upper and lower stop arms 152 and 153. Each of the stop arms has a stop platform 154 in the shape of a flat flange which projects into the chute 64 at about the longitudinal center thereof.

The stop arms 152 and 153 are preferably mounted so that the stop platforms 154 will project into the chute 64 from opposite sides. Furthermore, the stops are operated alternately so that the leaves 51 will be brought to a halt twice in the course of their passage longitudinally of the chute, in predetermined positions relative to the hinge forming and applying mechanism 67. To this end the upper stop arm 152 is located in back of the chute 64 so that the stop flange 154 thereof will project forwardly toward the chute 64 and the lower stop arm 153 is located in front of the chute with the stop flange 154 thereof projecting rearwardly toward the chute (Fig. 18). Moreover, the stop flanges 154 are so relatively positioned that in one position of the stops relative to the chute neither of them will be in obstructing relation to the passage within the chute.

An operating support for the stop arms 152 and 153 is provided by a rotatable, vertical operating rod 155 to which they are adjustably secured. This rod is journaled in spaced upper and lower bearing blocks 157 and 158 mounted upon the side frame bar 147 of the chute 64. At its upper end the rod 155 passes through a thrust bearing member 159 which rests upon the upper journal block 157 (Fig. 17). A winged set screw 160 is threaded into the thrust bearing 159 and is adapted to engage in any selected one of a longitudinal series of depressions or screw pits 161 in the operating rod 155. In this manner the stop arms 152 and 153 may be adjustably located vertically with respect to the chute 64 by selection of the appropriate screw pit 161 when securing the rod 155 and the thrust bearing 159 together. This is of importance where it may become desirable from time to time to change the points at which the hinges 50 are to be applied to the margins of the leaves 51. An example is where several sets of leaves to be hinged will ultimately be interleaved and mounted by groups with the hinges 50 in staggered relation upon common pintles. Such an arrangement is disclosed in our aforementioned copending application Serial No. 165,004. Moreover, the spacing between the hinges of each leaf may be adjusted to suit by regulating the spacing between the stop arms 152 and 153.

In the operation of the machine, the stop operating rod 155 is alternately rotated in opposite directions to carry first one and then the other of the stop arms 152 and 153 into operative position. For this purpose, the thrust bearing 159 is provided with an inwardly projecting, rigid crank arm 162 which has a pair of spaced parallel ears 163 at its inner end supporting a follower roller 164. A spring 165 acts to urge the arm 162 counterclockwise as seen in Fig. 18 so that the roller 164 will positively ride the periphery of a cam 167 which is mounted upon the driven shaft 118. The cam 167 has a section 168 of short radius for substantially half of the circumference, and a section 169 of substantially greater radius for the remainder of the circumference. The section 168 approaches the section 169 on a relatively gentle pitch, while return from the section 169 to the section 168 is relatively abrupt. Hence it will be seen that as the follower roller 164 rides the cam 167, the arm 162 will be swung back and forth in timed sequence and correspondingly oscillate the stop operating rod 155.

Assuming now that the cam 167 is rotating counterclockwise as indicated by the arrow in Fig. 16, and the follower roller 164 is riding the cam section 169, the stop operating rod 155 will be in a position to locate the upper stop arm 152 in leaf-stopping position. At the end of the cam section 169 the follower 164 abruptly passes to the cam section 168 thereby causing the stop arms 152 and 153 to shift instantaneously. Thus, by the time the advancing edge of the leaf 51 which has been supported by the stop arm 152 travels between the stops, the stop flange 154 of the lower stop arm 153 wil be in position to receive it.

At the end of the cam section 168, the follower 164 rides up the relatively gently pitched approach to the section 169 so that the rod 155 is rotated relatively slowly to shift the stop arms 152 and 153 in a manner to permit the leaf 51 to be released from the lower stop and clear the upper stop before the latter again moves into leaf stopping position.

Since the cam 167 is on the shaft 118 which controls the clutch mechanism 95 of the leaf feeding mechanism 63, it will be apparent that the leaf feeding mechanism and the stop mechanism 65 can be accurately correlated in operation by proper relative mounting of the cams. To this end, the shifting cam member 125 (Fig. 11) is preferably mounted to engage with the cam member 127 for operating the clutch 95 at approximately the same time that the lower stop arm is being swung out and the upper stop arm 152 is being swung into operative position. As a result, another one of the leaves 51 will pass into the chute substantially as the preceding leaf is finally released by the stop mechanism 65.

*Kick-out and restacking mechanism*

After the hinged leaves 51 are released by the lower stop 153, they drop into the kick-out and restacking mechanism 68 (Figs. 1, 2, 40, 41 and 42). Herein, the kick-out mechanism includes as a principal feature a pair of synchronized, rotatable kick-outs 170 which are preferably identical in structure. Each kick-out 170 provides a plurality of vertical pockets 171 substantially constituting, when alined therewith, continuations of the lower end of the chute 64. These pockets are formed by radial vanes 172 projecting from an axial kick-out body 173. The upper end of the body 173 is journaled in a bearing block 174 which is suitably connected to the lower end of the respective chute side frame bar 147 or 148, as the case may be. At its lower end, the body 173 is journaled in the ends of a base bracket member 175 and carries a bevel pinion 177 below the bracket member.

In the present instance the base bracket 175 is secured as by means of screws 178 below a pair of spaced, parallel supporting bars 179, which are mounted upon the crossbars 60 of the base framework 59 of the machine. Depending from the base bracket 175 are a pair of spaced, journal bosses 180. These support a kick-out drive shaft 181 to the opposite ends of which are secured bevel gears 182 meshing with the kick-out bevel pinions 177. Preferably, the ratio of the bevel pinions 177 to the bevel gears 182 is two to one so that with each one-eighth turn of the bevel gears, the kick-outs 170 will be rotated a quarter revolution.

In order to effect step-by-step actuation of the kick-outs 170, means is provided which is correlated in operation with the stop mechanism 65. In the present instance this means comprises a vertical actuating bar 183 which at its upper end is pivotally secured to the forward end of a suspension arm 184 (Figs. 3, 16, and 17). The latter overlies the stop-operating cam 167, and at its rear end is rigidly secured to a rock shaft 185 which is journaled at one end in the standard 75 and at the other end in an overhanging bearing bracket 185ª (Fig. 2) to lie in spaced parallel relation rearwardly and above the cam shaft 118. A rotary follower 187 (Figs. 3 and 16) is journaled between spaced ears 187ª depending from the lower face of the suspension arm 184. This follower 187 is located to ride the cam 167 spaced substantially one quarter of the circumferential distance around the cam from the follower 164 of the stop operating crank arm 162. As a result, the bar 183 will be reciprocated by the suspension arm 184 in timed relationship to the operation of the stop mechanism 65.

At its lower end, the kick-out operating bar 183 is pivotally connected to a link 188 (Figs. 3 and 42) which is freely pivoted at its other end upon the shaft 181. The link 188 carries a spring-pressed pawl 189 which engages a ratchet wheel 190 pinned to the shaft 181. The ratchet wheel 190 is constructed to be advanced by the pawl 189 one eighth of a turn with each full reciprocation of the operating bar 183. A back-lash pawl 191 holds the ratchet wheel against return movement. A tension spring 191ª may be connected to the bar 183 for positively urging the latter longitudinally downwardly.

It will be apparent that through the action of the actuating cam 167 the sequence of correlated actions of the stop mechanism 65 and the kick-out mechanism 68 will be substantially as follows: A hinged leaf will be released by the lower stop 153 (Fig. 1) into the receiving pockets 171 of the kick-outs 170 (Fig. 40), and the upper stop 152 will move into position to receive the next leaf. Following this, the kick-out operating bar 183 (Figs. 1, 3, and 42) will be dropped to carry the pawl 189 to the next tooth of the ratchet wheel 190. Then the upper stop 152 will move out and the lower stop 153 will move into leaf-holding position. Finally the kick-out operating bar 183 is raised and the pawl 189 advances the ratchet 190 one eighth of a revolution, thereby rotating the kick-outs 170 a quarter turn and ejecting the leaf 51 which has been deposited therein to recondition the kick-outs for receiving the said next leaf 51 (Fig. 42).

As the leaves 51 are ejected by the kick-outs, they are restacked and moved forwardly along the supporting bars 179 against a retaining arm 192 (Fig. 40). This retaining arm may be pivotally mounted as at 193 at one side of the base framework 59 and is maintained under resilient tension by a spring 194. Alinement of the restacked sheets 51 as they are ejected by the kick-out members 170 is maintained by suitable guide means such as bars 195 projecting forwardly from the bearing blocks 174 above the kick-outs 170 (Figs. 3 and 41), and curbs 196 therebelow.

Leaf counting mechanism

As each of the leaves 51 passes through the chute 64, a record of such passage is kept by the counting mechanism 69 (Figs. 1, 2, 3, 4, and 6), which is correlated in operation with the feeding mechanism 63, the stop mechanism 65, and the kick-out mechanism 68. Herein the counting mechanism 69 includes a mechanical counter 197 of any suitable construction. This is mounted upon a bracket 198 secured to that end of the main bed 61 of the machine which is adjacent to the chute 64. The counter 197 has an operating shaft 199 and a suitable resetting handle 200. Adjustably secured to the operating shaft 199 is a forwardly projecting crank arm 201 which carries an upwardly extending, rigid, pointed finger 202. Each time that the crank arm 201 is depressed by rotation of the shaft 185, the shaft 199 is rotated and the counter 197 registers an additional digit.

To correlate operation of the counter 197 (Figs. 3 and 4) with the other operating mechanisms mentioned, means is provided which will be actuated by the rock shaft 185 of the kick-out operating mechanism. Accordingly, a forwardly projecting lever 203 is rigidly secured to the end of the rock shaft 185 which is nearest the counter. Upon the outer end of this lever 203 is mounted a pendant counter-actuating arm 204. The arm 204 is of such a length that when the lever 203 is in its uppermost position, the lower end of the arm is in a position above the pointed end of the upstanding counter-actuating finger 202. Engagement of the finger by the actuating arm 204 is facilitated by the provision of a notch 205 in the lower end of the arm. Through this arrangement, when the rock shaft 185 is rotated forwardly by the dropping of the suspension arm 184, the counter-actuating arm 204 will likewise drop, carrying the notched lower end thereof toward the counter-operating finger 202.

In the present instance, the length of the lever 203 relative to the crank arm 201 is such that the pendant actuating arm 204 will normally pass forwardly of the actuating finger 202. Therefore, in order to actuate the counter 197 the actuating arm 204 must be swung rearwardly as it drops so that the actuating finger 202 will engage in the notch 205. For this purpose a contact member 207 is secured to the actuating arm 204 and projects into the chute 64 to be engaged by each of the leaves 51 that is fed into the chute. Upon such engagement by the leaf, the contact member 207 swings the lower end of the arm 204 rearwardly over the end of the finger 202 and holds it there until the arm 204 is lowered. Thus the leaf to be counted itself governs the necessary interengagement of the counter-actuating mechanism.

Hinge forming and applying mechanism

An important feature of the invention resides in the hinge forming and applying mechanism 67 which operates to supply the leaves 51 with the hinges 50 (Figs. 37 and 38) while the leaves are supported in position in the chute 64 by the upper stop 152 or the lower stop 153. Herein this mechanism is adapted to receive a continuous ribbon 208 of suitable hinge material, form the hinges 50 therefrom and apply the hinges to the leaves 51.

The ribbon 208 may be of suitable steel tape supplied as a large flat roll 209 (Figs. 2 and 6) which is supported at the rear of the machine horizontally upon a turntable 210. The latter may be suitably journaled upon a supporting bracket 211 which has a vertical spindle 212 for this purpose. A substantially semicircular stationary tape-whip guard 213 may be mounted by means of a rigid bracket 214 in partial circumferential, coaxial registration with the turntable 210. To avoid overrunning of the roll 209, a friction brake member 215, here in the form of an eccentrically perforated metal slat, may be removably laid upon the roll. The brake member is held in position on the roll by the spindle 212 and has one end projecting beyond the periphery of the turntable 210 to engage one end of the guard 213.

From the roll 209, the ribbon 208 passes around the right side of the bed 61 through a suitably constructed ribbon guide 217 and thence across the front of the machine to the forming and applying mechanism 67.

As shown herein (Figs. 21 to 36), the forming and applying mechanism 67 is constructed as a substantially self-contained unit assembled upon an elongated main bed or block 218. This block is secured at its opposite ends as by means of bolts 219 to a flange 220 which defines the ends of an elongated opening 221 in the main bed 61 of the machine. The steel ribbon 208 passes through a ribbon guide 222 which is mounted at the approach end of the main block 218 and is fed onward to punching, severing, and forming means, to be described, by which it is fashioned into the hinges 50.

The main block 218 is provided with a longitudinal, horizontal slot 223 serving as an open chamber to receive a large proportion of the working mechanism. As the ribbon 208 is fed to such mechanism the first step of hinge formation encountered, is that of partial preparation or punching. Accordingly, at a suitable intermediate point of the chamber 223 is secured a punch guide block 224 (Figs. 21, 25 and 31) which has a pair of spaced, parallel grooves 225 and 227 in its upper face. These grooves run in a front-to-back direction and serve as guideways for a pair of reciprocable punch stems 228 and 229. At their forward ends, the stems 228 and 229 carry aperture-cutting and prong-striking punches 230 and 231, respectively, which mate with die apertures 232 and 233 in a die plate 234. This die plate is secured to the front face of the main block 218.

At their rear ends, the punch stems 228 and 229 are rigidly connected in alinement, in a suitable head 235 for reciprocation in unison. Herein the head includes a lower member 236 having upper-face punch-stem grooves 237. The punch stems are held fast in these grooves by an upper clamping plate member 238 which is secured to the lower member 236 by bolts 239 (Figs. 25 and 28).

Projecting rearwardly from the head members 236 and 238 is a pair of spaced parallel, and coaxially perforated ears 240 between which one end of a link 241 is fastened pivotally by means of a bearing pin 242. At its opposite end, the link 241 is pivotally connected by means of a bearing bolt 243 to a short toggle link 244 and an actuating link 245 (Figs. 21 and 25). The toggle link 244 is pivotally connected by a pin 247 to the outer end of a suitable rearwardly projecting base bracket or arm 248 which is secured to the lower face of the main block 218. Thus it will be apparent that as the toggle linkage 241, 244 is straightened out by the actuating link 245, the head 235 will be shifted forwardly to carry the punch stems 228 and 229 forwardly and cause the punches 230 and 231 to enter into mating relation with the apertures 232 and 233, respectively, in the die plate. This results in the formation of the longitudinally spaced prong 55 and the aperture 57 in the leading end portion of the ribbon 208.

A cover plate 249 (Fig. 25) is secured in enclosing relation to the punch guide grooves 225 and 227. At its forward end the cover plate 249 projects a predetermined distance beyond the guide block 224 to abut the die plate 234. In assembly this defines a clearance for the ribbon 208 between the opposed faces of the die plate 234 and the punch guide block 224 (Fig. 27) of a width at least as great as the length of the prong 55. To support the ribbon in this clearance, a ribbon guide piece 250 (Figs. 22, 27, 29, and 30) having an inwardly projecting thin ledge or rest 251 is secured to the face of the block 218 adjacent to the edge of the die plate 234.

A plunger 252 (Figs. 21 and 25) partially enclosed within a barrel 253 and extending through the die plate 234, is urged against the ribbon 208 by a spring 254 normally to press the ribbon against the face of the punch guide block 224. Thus, when the punches 230 and 231 are driven forwardly they will carry the ribbon in opposition to the plunger 252 against the face of the die plate 234 and then pass through the ribbon into the respective die apertures 232 and 233. When the punches are retracted, the plunger 252 pushes the ribbon back to its initial position to clear the formed prong 55 from the prong aperture 233. Moreover, the plunger at all times serves to hold the tape frictionally against undesirable longitudinal movement. Ribbon punchings drop from the die plate into a receptacle 255 suitably mounted therebelow upon the adjacent side bar 148 of the leaf guiding chute (Fig. 1).

After the ribbon 208 has been punched, it is advanced one hinge-section length to bring the succeeding portion into place to be punched. Such advance is effected by a reciprocable elongated feed finger 257 (Figs. 22, 29 and 30) which is mounted to extend into the clearance between the punch block 224 and the die plate 234 and engage the prong 55 to push the latter onwardly the requisite measured distance.

At its forward end the feed finger 257 is turned up to provide a prong-engaging tip 258 (Figs. 22, 29 and 30). At its rear end the finger 257 has an elongated squared base 259 which is eccentrically attached rigidly to an elongated rocker piece 260 as by a screw 261 (Figs. 26, 29, and 30) to project cantilever fashion. The rocker piece 260 is rigidly assembled with an annular stub shaft 262 which extends rearwardly slidably into a suitable bore 263 in a carriage member 264 (Figs. 21 and 22). This carriage member is proportioned to fit slidably in the mechanism chamber 223 of the main block 218 and has an integral face plate 265 which engages a rearwardly offset portion 266 of the front face of the main block 218. At the rear, a retaining plate 267 is secured to the carriage 264 by means of bolts 268.

To actuate the carriage 264 reciprocally, a pitman 269 (Figs. 1, 29, and 30) is connected by means of a yoke member 270 to the lower end of the rocker piece 260. A forwardly projecting annular boss 271 on the rocker piece 260 provides a pivot for the yoke member 270. Rocking motion of the rocker piece 260 under the influence of the pitman 269 is limited by opposed, adjustable limiting screws 272 which are arranged to engage the respective opposite sides of a narrow rocker finger 273 projecting from the rocker piece. These limiting screws are threaded through spaced bosses 274 located on the front face plate 265 of the carriage to receive the rocker finger 273 therebetween. Thus, when the pitman 269 moves forwardly, the rocker piece 260 will initially pivot clockwise a limited extent as allowed by the rocker finger 273 and the limiting screws 272. This causes the prong-engaging tip 258 of the feed finger to move upwardly into position back of the hinge prong 55 (Fig. 30). Continued forward movement of the pitman 269 causes the carriage 264 to slide forwardly, thereby advancing the ribbon 208. Return motion of the pitman 269 initially effects counterclockwise rocking of the piece 260 (Fig. 29) to move the feed finger tip 258 downwardly. Thus, the finger 257 will clear the next-formed prong 55 as it is retracted by the shifting of the carriage 264 back to starting position.

When the ribbon 208 is advanced by the feed finger 257, the pronged and apertured extreme end section of the ribbon is brought into position to be severed and bent upon itself to provide the yoke 52 and the legs 54 of the hinge as well as to force the prong through the margin of the associated leaf 51 and into the aperture 57, there to be bent over for connecting the hinge to the leaf. As shown, (Figs. 23 and 31 to 34), the means for accomplishing the final steps in the formation of the hinge 50 and the application thereof to the leaf 51, hence include, generally, a stationary shear blade 275, an arbor 277, a former 278 which coacts with the shear blade to sever the end section of the ribbon and bend it about the arbor, and a forming block or table 279 which finally coacts with the former 278 to finish the hinge.

In the present instance, the stationary shear blade 275 is located with its cutting edge slightly forwardly (to the left in Fig. 31) of the inner face of the die plate 234 and spaced longitudinally of the path of the ribbon 208 substantially one hinge-section length from the nearest punch guide groove 227. Preferably, the shear blade 275 is formed integrally with a base 280 which is removably supported between suitable interfitting, inner and outer separable mounting blocks 281 and 282, respectively. The inner block 281 abuts the front face of the main block 218 and supports the outer block 282. Bolts 283 (Figs. 24 and 36) maintain the assembled relation of the mounting blocks 281 and 282, and secure the assembly to the main block 218. By constructing the shear blade 275 and the blade base 280 to provide a rabbet groove 284 alongside the inner block 281, clearance is provided to accommodate the prong 55 of the next succeeding hinge section of the ribbon, when the ribbon is moved toward the shear blade by the punches 230 and 231. Shearing adjustment of the blade 275 is effected by means of screws 284ᵃ which are adapted to be locked in their adjusted position.

The arbor 277 is located on an axis parallel to the plane of the ribbon 208 and properly spaced beyond the shear blade 275 to permit a hinge section to be bent double thereabout to produce the hinge yoke 52 and bring the ends of the doubled section into alinement as the hinge legs 54. The diameter of the arbor 277 is determined by the diameter of the pintle or rod 53 to be received by the yoke 52.

As shown in Figs. 23 and 36, the arbor depends from a carrying head 285 and is adapted to receive substantially the mid-portion of the partially prepared end hinge section of the ribbon 208. The latter hinge section is severed by the former 278 coacting with the shear blade 275 as a movable shear, thus providing a hinge blank 287 (Fig. 32).

For this purpose, the former 278 is constructed as a flattened head which projects to one side of an integral axle 288 and is adapted to oscillate on a radius thereabout within the mechanism chamber 223. The axle 288 has its upper end journaled in a suitable bearing aperture 289 in the upper wall of the main block 218 (Fig. 23). A bearing block 290 provides a journal for the lower end of the axle and is suitably secured in an appropriate recess in the lower wall of the main block 218.

The actual hinge-fashioning portion of the former 278 is in the shape of a tapered presser finger 291. At its forward end the finger 291 is shaped to provide a suitable shearing edge 292 which travels on the extreme radius of the former to sever the hinge blank 287 on advancing past the shear blade 275. As the presser finger 291 travels on toward the arbor 277, it moves the abutting end portion of the hinge blank 287 ahead of it in an arc about the arbor 277 until such portion of the blank lies as one of the hinge legs 54 parallel with the margin of the leaf 51 which is waiting to receive the hinge. At the later point in the forming operation, the inner face of the presser finger which is in a flat plane 293 also lies parallel with the face of the leaf 51 (Fig. 34).

Moreover, the arbor 277 is received coaxially in an annular groove 294 at the base of a substantially V-shaped recess or mouth 295 between the inner face of the presser finger and the body of the former. The diameter of the groove 294 is equivalent to the exterior diameter to be imparted to the yoke sleeve 52 of the hinge, and it is so located as to provide a relatively sharp heel 296 at the base of the inner face 293 of the presser finger. This heel 296 assures a relatively clean-cut angular merger of the yoke sleeve 52 and the hinge leg 54 on that side of the yoke sleeve. This is the leg which has the aperture 57.

The opposite leg 54 of the hinge is produced from that portion of the hinge blank 287 which has been advanced beyond the arbor 277 and has the prong 55. While the former 278 is in hinge-forming movement, this pronged leg 54 is held in place relative to the arbor 277 by the forming table 279 and is eventually finished by the latter.

For this purpose the forming table 279 is of flattened, elongated shape and is mounted in the mechanism chamber 223 with one end tapered to provide a nose 297 which extends between the arbor 277 and the former 278. The other end of the table is pivotally connected to the main block 218 by a bearing pin 298 in such a manner that the front face of the table lies adjacent to the front face of the main block. The bearing pin 298 may be eccentric to permit slight adjustments in the position of the forming table 279.

The nose 297 of the forming table is normally held away from the arbor 277 by a draw pin 299 (Figs. 21 and 31), which is pivotally connected in a suitable slot 300 (Fig. 31) in the inner side of the forming table and projects rearwardly through a thrust plate 301 (Fig. 21). A compression spring 302 acts between the thrust plate 301 and an adjustable collar or nut 303 on the outer end of the draw pin 299. As a result, the latter acts to draw the forming table 279 counterclockwise as seen in Fig. 31 or into its non-forming position. In this position there is sufficient clearance between the arbor 277 and the forming end of the table to permit unimpaired advance therebetween of the prong 55 of a hinge section.

The tapered nose 297 of the forming table has a flat plane front face 304 which is substantially complementary to the inner flat face 293 of the presser finger 291 of the former. Along the back face of the nose 297 the taper is on a gentle concave arc longitudinally to provide a bearing face 305, which terminates at the tip of the nose in a shoulder 307 shown as providing a convex approach to the bearing surface. Thus, as the former 278 swings around into hinge-forming position, a suitably located spring-urged, bullet-nosed plunger 308 projecting therefrom will engage the nose-tip shoulder 307 of the forming table and ride onto the bearing surface 305. This causes the forming table 279 to yield in opposition to the spring-urged draw pin 299 to carry the hinge ribbon into firm abutment with the arbor 277 (Figs. 32 and 33). Such engagement of the nose 297 by the plunger 308 is preferably contemporaneous with severance of the hinge blank 287. Thus, the hinge blank 287 will be held at three spaced points respectively by the nose 297, the finger 291 and the arbor 277 against displacement longitudinally of the arbor.

As the presser finger 291 travels toward completion of the hinge, the plunger 308 rides in pressure engagement along the arcuate bearing face 305, and the forming table nose 297 enters deeper into the V-shaped mouth 295 of the former 278. Then as the final stage in the forming process is reached, the nose-tip shoulder 307 engages an inner bearing surface 309 opposite the finger surface 293 within the former mouth 295. Such inner bearing surface 309 is formed on a tangent to the sleeve-forming groove 294 of the former 278, and serves in the last forward movement of the former 278 to shift the forming table nose 297 finally toward the arbor 277. This results in generating substantial compressive force between the presser finger 291 and the nose 297 by bringing the flat former face 293 and the table face substantially into parallelism, thereby pressing the hinge legs 54 tightly against the margin of the leaf 51 (Fig. 34).

At this moment the yoke sleeve 52 is also completed, an annular groove 310 at the tip end of the forming table face 304 (Fig. 35) cooperating for this purpose with the sleeve-forming groove 294 in the former 278.

To form the crimps 58 in the hinge (Figs. 38 and 39), the hinge face 304 of the forming table nose 297 (Fig. 35) is provided with a plurality of elongated, parallel, teeth 311 which project from the plane thereof adjacent to and at right angles to the yoke-sleeve groove 310. Thus, in the compression between the nose 297 and the presser finger 291, the teeth 311 will be driven into the adjacent hinge leg 54. At the same time the resulting crimps 58 will bite into and remain set in the marginal edge of the leaf 51.

Moreover, during the last part of the hinge-forming operation, as the legs 54 of the hinge are brought together by the coacting pressure finger 291 and the forming table nose 297, the prong 55 punctures the associated margin of the leaf 51, enters the aperture 57, and is bent over to hold the legs 54 in permanent clamping relationship with the leaf margin. For this purpose, the tip 292 of the pressure finger 291 is suitably tapered or rounded between the shearing edge thereof and the flat inner compression face 293. Thus, after the prong 55 projects through the aperture 57, (Fig. 33) the tip 292 will engage the prong with a wiping action to bend the same over against the adjacent leg 54 (Fig. 34).

The operation of the former 278 and the punches 230 and 231 is preferably correlated through the medium of common driving mechanism. Accordingly, the upper end of the former axle 288 (Figs. 21 and 23) projects from the bearing aperture 289 and has keyed thereto a sector pinion 312. Meshing with this sector pinion is a sector gear 313 which is suitably secured rigidly to a shaft 314. A bearing for the shaft 314 is provided by a journal block 315 which is bolted to the rear face of the main block 218. Pinned to the shaft 314 within a horizontal slot 317 in the journal block is a connecting yoke 318 which is secured pivotally to the end of the punch actuating link 245 by a bearing pin 319. An actuating bar 320 is pivotally connected to a boss 321 upon the upper face of the sector gear 313.

The sector pinion 312 and the sector gear 313 are so related that when they are actuated by the bar 320 from a predetermined initial position as shown in Fig. 21 to a predetermined final position, the former 278 will be driven into hinge-fashioning position. Simultaneously, the connecting yoke 318 is swung in an arc to pull the punch actuating link 245 longitudinally to straighten the toggle links 241 and 244 from an initial, predetermined angular relationship to a straightened relationship wherein the punch head 235 will be in its foremost or punching position. In the preferred arrangement, the punches will engage the hinge ribbon 208 ahead of the shear tip 292 of the former head so that the ribbon will be shifted laterally into proximity to the shear blade 275 and will be held against longitudinal movement before it is engaged for severance.

After the hinge 50 has been completed and the former 278 and the forming table 279 have been returned to their initial positions, the arbor 277 is stripped from the yoke-sleeve 52. Herein the arbor stripping operation is effected by axially drawing the arbor 277 through a stripper 322 which is interposed between the arbor carrying head 285 and the upper end of the yoke-sleeve 52 (Figs. 23 and 31). As shown, the stripper 322 is in the form of an elongated, flat plate which fits slidably between the upper face of the forming table 279 and the upper wall of the mechanism chamber 223. One end of the stripper plate 322 is suitably apertured to receive the eccentric pivot pin 298 of the forming table. The other end of the stripper plate 322 is of reduced width and shaped to provide an annular stripper head 323. The arbor 277 passes slidably through an aperture 324 in the stripper head 323. Thus, if the yoke-sleeve 52 of the hinge adheres to the arbor 277, the stripper head 323 will force the sleeve off as an incident to upward axial movement of the arbor.

Such axial movement is imparted to the arbor 277 by shifting the arbor head 285 automatically after the hinge 50 has been completed. For this purpose, the arbor head 285 is provided with an elongated substantially channel-shaped base portion 325 (Figs. 23 and 24) which interengages with the upper mortised end of a vertical carrying bar 327. Preferably, limited play is permitted between the head and the carrying bar in order to compensate for possible slight manufacturing inaccuracies which may tend to cause transverse movement of the arbor 277 during the hinge forming operation. However, a normal relative position is maintained between the arbor head 285 and the carrying bar 327 by a compression spring 328 which bears against the heel of the arbor head base 325 and is mounted within a recessed abutment plate 329 which is secured as by a bolt 330 to the upper end of the carrying bar 327.

The carrying bar 327 is longitudinally reciprocable within a groove 331 in the adjacent side face of the outer block 282 (Fig. 31) within which it is held by a retaining plate 332. A rabbet notch 333 within the upper, side edge of the block 282 cradles the arbor head 285 in the lowermost position of the latter.

After the hinge has been formed, the arbor carrying bar 327 (Figs. 22, 23, and 31) is moved longitudinally to shift the arbor head 285 out of the cradle notch 333 and strip the hinge from the arbor 277. Such movement is effected by a rocker arm 334 which has a rounded end 335 engaging within a notch 337 in the lower end portion of the carrying bar 327. Intermediate its ends, the rocker arm 334 is provided with a journal 338 (Figs. 22 and 25) to receive a pivot pin 339. The pivot pin is suitably secured as by a set screw 340 within a supporting block 341 which is bolted to the lower face of the main block 218 of the forming unit.

At its rear end the rocker arm carries a follower roller 342 which rides within a suitable cam aperture 343 in a cam plate 344. The cam aperture 343 is of substantially parallelogram shape with spaced, cam surfaces 345 and 347 inclined toward the arbor head-carrying bar 327. As the follower roller 342 rides up the cam surface 347, the rocker arm 334 will be rocked to shift the arbor carrying bar 327 downwardly and when the follower roller rides down the cam surface 345 the carrier bar will be shifted upwardly.

The cam plate 344 is mounted rigidly upon the carriage member 264. Thus, it will be apparent that upon reciprocation of the carriage member 264, the arbor 277 will be correspondingly moved into or out of hinge-forming position. That is, as the carriage 264 is shifted to advance the hinge ribbon 208, the arbor will be moved into hinge-forming position (full line position of Fig. 23 and Fig. 29). As the carriage 264 is returned, the arbor 277 will be moved out of hinge-forming position to strip the newly formed hinge 50 (broken outline positions of Figs. 23 and 30). Of course, the spacing between the cam surfaces 345 and 347 is calculated to provide for sufficient time lag between actuation of the carriage 264 and rocking of the arm 334 so that the prong 55 will be moved past the arbor 277 by the feed finger 251 before the arbor is moved down into hinge-forming position; and so that during the return movement of the carriage 264 the arbor will remain in its hinge-forming position and will not be retracted until the hinge is completed.

*Means for alining leaves during hinge forming and applying operation*

During the hinge-fashioning and applying operation, the leaf 51, in addition to being supported within the chute 64 either by the stop 152 or the stop 153, is alined adjacent to the arbor 277 by a suitable arrangement of guiding and alining means. To this end, a pair of opposed, suitably shaped front and rear plate guides 348 and 349 (Figs. 1, 21, 22, and 23) are mounted within the chute 64 adjacent to the hinge-forming unit 67. These plate guides define a narrow space therebetween which is of a width only slightly greater than the thickness of the leaf 51 and is disposed in a vertical median plane which longitudinally bisects the arbor 277 (Figs. 1, 21 and 31). The front guide 348 may be screwed to the adjacent front connecting bar 149 of the chute, and the rear guide 349 may be secured by means of bolts 350 to the adjacent end of the main block 218 of the hinge-forming unit. A small supplemental guide 351 in the form of a narrow finger may be secured to the adjacent rear connecting bar 150 to depend as a guard in front of the sector pinion 312.

A proper predetermined spaced relationship between the edge of the leaf 51 and the arbor 277 is maintained by the outer edge of the arbor carrying head 285 (Figs. 21 and 24). Moreover, while the hinge is being formed, suitable means acts positively to shift the leaf, if necessary, toward engagement with the edge of the arbor head 285. Such means is shown herein as comprising a pusher plate 352 which is mounted within a recess 353 opposite the hinge-forming unit 67 in the side bar 147 of the leaf chute (Figs. 1, 4 and 5). The pusher plate is normally held in its recess by means of compression springs 354 acting between a bolster plate 355 and the heads of draw bolts 356 which extend outwardly through the side bar 147.

During the hinge-forming operation, the pusher plate 352 (Figs. 1, 4, and 5) is pulled from its recess against the adjacent edge of the leaf 51 by a connecting rod 357 which is operatively hooked to the end of the actuating bar 320 (Fig. 21) of the hinge-forming unit. Desirably, the end of the actuating bar 320 is provided with a series of spaced apertures 358 which permit adjustment of the distance that the connecting rod 357 will pull the pusher plate 352 toward the leaf 51. This is of advantage where the leaf widths may be varied from time to time. Further adjustment in this respect may be provided for by having the pusher-plate end of the connecting rod 357 project through and beyond the pusher plate and securing thereto an abutment collar 359, herein comprising a pair of lock nuts. The distance of the lock nut collar 359 from the adjacent face of the pusher plate 352 may be varied within limits as desired while the pusher plate is in the inoperative position.

*Drive mechanism*

All of the operating parts of the machine are preferably driven from a single prime mover, in the present instance consisting of a suitable electric motor 360 which may be conveniently mounted upon the base frame 59, to actuate the drive mechanism 70 (Fig. 1). The motor drives a belt 361 which runs over a pulley or sheave 362 pinned to a power shaft 363 (Figs. 1, 3, 6, 19 and 20). The power shaft is journaled in a suitable bearing block 364 which may be secured by bolts 365 in enclosing relation to a gear housing 367. The latter may be formed integrally with the main bed 61 of the machine. A worm 368 on the power shaft 363 drives a worm gear 369 which is keyed to a vertical transmission shaft 370. The upper end of the transmission shaft 370 carries a bevel gear 371 for driving a bevel pinion 372 fixed upon the end of the leaf feed drive shaft 97. Thus, the leaf feed drive shaft 97 will be constantly rotated at a predetermined speed while the power shaft 363 is actuated.

Below the bevel gear 371, a driving gear 373 is pinned to the transmission shaft 370 and meshes with a large transmission gear 374. The gear 374 is secured to a vertical shaft 375 which is journaled in vertically spaced hub bosses 377 and 378 which project forwardly from the main bed 61. Secured to the shaft 375 between the hubs 377 and 378 is a cam disk 379 the lower face of which has a cam groove 380. A follower roller 381 to ride in the groove 380 is carried by the outer end portion of the former actuating bar 320 which underlies the cam disk. Outwardly beyond the follower roller 381, the bar 320 is formed with an elongated eye 382 to receive the transmission shaft 375. During each complete revolution of the cam disk 379 the former actuating bar 320 will be reciprocated once by the passage of the follower roller 381 through a suitably formed cam convolution 383 in the groove 380. As a result, the hinge former 278 and the punches 230 and 231 will be operated at timed intervals governed by the speed of rotation of the cam disk 379.

At its lower end, the shaft 375 is provided with a crank member 384 to which the outer end of the pitman 269 (Figs. 19, 21, and 22) is pivotally connected by a pivot pin 385. In this manner the pitman 269 will also be reciprocated once during each complete revolution of the cam disk 379 and thereby move the ribbon feed carriage 264 correspondingly.

Proper relative timed sequence of the operations governed by the former actuating bar 320 and the pitman 269, respectively, is attained by appropriate relative location of the cam convolution 383 and the eccentric pin 385.

In order to permit of driving the machine manually, the forward end of the power shaft 363 may be projected and provided with a suitable transverse pin 387 (Figs. 19 and 20) to receive a suitable crank 388. During nonuse, the crank 388 may be supported within a suitable holder 389 conveniently located at one side of the machine as, for example, under the ribbon guide 217.

In the present instance, the power control means for the electric driving motor 360 comprises an appropriate mercury snap switch, indicated generally at 390, mounted upon the upper face of the main bed 61 within convenient reach of the machine attendant (Figs. 1, 7 and 8). Briefly, this switch includes an oscillatable mercury tube mount 391 pivoted upon a suitable bracket 392, and arranged to be held in the "on" or "off" positions by a suitable yieldably mounted snap pin 393. Electrical leads 394 connect the switch in the motor operating electrical circuit. To operate the switch, a handle 395 depends from the switch disk 391 below a cover guard 397 which is secured to the bracket 392 in enclosing relation to the switch. Thus the motor 360 may be started or stopped simply by throwing the switch handle 395 to the "on" or "off" positions, respectively.

Safety means

Inasmuch as the driving motor 360 will actuate the power shaft 363 at relatively high speed it would be dangerous to have the hand crank 388 thereon when the motor is started, or to insert the crank while the motor is running. Safety means is therefore provided which will positively prevent starting of the motor while the crank is in operative engagement with the power shaft 363 or insertion of the crank unless the driving motor is shut off. Herein this safety means includes a reciprocable safety rod 398 (Figs. 1, 19 and 20) which is pivotally connected at one end to the switch handle 395 and is slidably guided through a transverse bore 399 in the upper journal boss 377 behind the shaft 375 (Figs. 7, 19 and 20). In the "on" position of the switch handle, the outer end of the rod 398 must engage within a peripheral groove 400 which is formed in the power shaft 363 in front of the connecting pin 387. Thus, the hand crank 388 positively cannot be connected to the power shaft 363 and the motor 360 operated at the same time.

Automatic switch shut-off

To prevent useless operation of the machine when the hinge tape 208 comes to an end, the invention contemplates the provision of means which will, in such event, act automatically to open the switch 390. Herein, such means includes a bell-crank shut-off lever 401 (Figs. 1, 7, 21 and 22) which is pivotally mounted upon the upper end of a standard 402 forming part of the ribbon guide 222. One arm of the shut-off lever projects downwardly and bears against the rear face of the ribbon with a substantially scissors relationship to the ribbon guide. The other arm projects rearwardly into engagement with a vertical connecting rod 403. A tension spring 404 is connected between the end of the rearwardly projecting lever arm and a suitable stud 405 which may be secured to the end of the main block 218 of the forming unit. The tension spring tends constantly to pivot the shut-off lever 401 to carry the depending arm across the path of the ribbon. The upper end of the connecting rod 403 has an adjustable lost motion connection with a switch arm 407. Herein, spaced stop nuts 408 are threaded upon the connecting rod to provide the limits of the lost motion connection.

Through this arrangement, it will be seen that although the switch 390 may be manually actuated to the "on" and "off" positions without affecting the shut-off lever 401 while the ribbon 208 is unexhausted, yet when the ribbon 208 for any reason comes to an end, as by breakage, or exhaustion of the roll 209 of ribbon, the tension spring 404 will instantly pivot the lever, draw the connecting rod 403 downwardly and throw the switch 390 to the "off" position. If an attempt is made to throw the switch to the "on" position without replacing the hinge ribbon 208, the automatic shut-off will operate instantly upon release of the switch handle 395. Ribbon remaining in the forming unit 67, between the ribbon guide 222 and the former 278 may be used up by maintaining the machine in operation by holding the switch 390 open manually.

In operation the machine proceeds cyclically to feed one leaf after the other from a stack, to make and apply the hinges to the leaves, and to restack the hinged leaves. Before starting, the machine, however, the hinge ribbon 208 should be fed into the forming and applying mechanism 67 and one of the hinge blanks 287 should be punched in readiness to be applied. This punching can be effected either by actuating the drive mechanism 70 by hand with the crank 388 or by snapping on the control switch 390 momentarily to actuate the motor 360 and the drive mechanism for a sufficient interval. Then, a stack of the leaves 51 having been placed in the mechanism 62, the control switch 390 can be snapped on for continuous operation.

The drive shaft 97 will immediately start rotating to begin the cycle of operation by effecting interengagement of the cam members 125 and 127 to shift the shaft 118 axially for actuating the clutch 95 whereby to complete the driving connection for actuating the feed rollers 84 and the agitators 109. This causes the front leaf 51 of the stack to be fed by the rollers 84 downwardly from the magazine 62 into the chute 64 where it will shift the counter controlling contact member 207 rearwardly. As soon as the trailing end of this leaf has passed the feed rollers 84, the next leaf 51 is engaged by the rollers 84 and fed the short distance necessary to engage the trigger wheel 143. This releases the trigger arm 138 so that the latch arm 130 will drop to release the clutch 95 for stopping the feed rollers 84.

The leaf 51 which has been fed into the chute 64 is halted by the upper stop 152 and is registered by the counting mechanism 61.

In the meantime the pitman 269 will have acted to move the carriage 264 of the hinge forming and applying mechanism 67 ahead to cause the ribbon feed finger 257 to advance the ribbon 208 and the already-punched hinge blank 287 into forming position relative to the forming arbor 277. By the same action of the carriage 264, the arbor 277 is lowered into hinge forming position. Thereupon, the former-actuating arm 320 is reciprocated to actuate the former 278 and the punching head 235 whereby to cause a hinge 50 to be formed and applied to the margin of the halted leaf 51 and to cause another one of the hinge blanks 287 to be formed.

Thereafter, the upper stop 152 is retracted and the lower stop 153 is swung into position to halt the leaf 51 at a lower position in the chute 64. The hinge forming and applying mechanism 67 is then actuated again by the pitman 269 and the actuating arm 320 for attaching the second hinge 50 to the margin of the leaf 51.

Following this, the lower stop 153 is again swung out of the chute 64 for releasing the fully hinged leaf 51 and the upper stop 152 is returned into position for receiving the succeeding leaf 51. The hinged leaf 51 drops into the waiting kick-outs 170 of the restacking mechanism 68 from which the leaf is subsequently cleared by rotation of the kick-outs shortly before the succeeding leaf 51 is ready to be discharged thereinto.

While in general the various operating parts of the machine have been illustrated openly, it should be understood that suitable guards and covers may be provided wherever it is deemed expedient. For example, the transmission gearing of the drive mechanism 70 may be enclosed by a suitable cover 409 (Fig. 19). A cover 410 may be provided for the clutch mechanism 95, and a guard 411 may conceal the agitator driving sprockets and chain (Figs. 1 and 6). Likewise, the hinge-forming unit 67 may be at least partially enclosed by a cover guard 412.

From the foregoing it will be apparent that the present invention provides a practical, inexpensive, and highly efficient method of and means for producing and applying hinges to leaves for use in loose-leaf catalogues or files. The machine is relatively fool-proof and may easily be operated by persons of little or no mechanical skill. It is merely necessary to place a stack of leaves to be hinged in the leaf magazine of the machine, throw the control switch, and all further operations including restacking of the hinged leaves occur rapidly and automatically in timed sequence. Numerous adjustments and adaptations may be made in the operation of various parts of the apparatus to attain the desired results, and considerable choice is permitted as to the location of the hinges upon the margins of the leaves.

We claim as our invention:

1. A machine of the character described comprising, in combination, an upright framework including a horizontally elongated main bed at the top thereof, a magazine for leaves to be hinged including supports mounted upon one end portion of said bed, means for consecutively feeding the leaves from said magazine downwardly in front of said bed, a chute depending from said magazine to receive the fed leaves, means carried by one of said magazine supports for counting the leaves which are fed into the chute, movable means for stopping the leaves in the chute, means supported at the front of said bed for forming hinges and applying the hinges to the leaves while the latter are stopped in the chute, means at the lower end of said chute for restacking the leaves after they have been hinged, a support for a roll of hinge ribbon in back of said bed, a guide for the ribbon as it passes from said support to said forming means, means for feeding the ribbon to said forming and applying means, driving mechanism mounted on the other end portion of said bed for actuating all of said means in timed sequence in a continuous operating cycle, an electric motor mounted on said frame and having a power connection with said driving mechanism, means for actuating said driving mechanism manually, an electrical control switch for said motor mounted at a convenient place on said bed, safety means connected with said switch to prevent closing thereof and starting of said motor when said manual drive-actuating means is in condition for use, and an automatic shut-off for opening said switch to stop said motor when the hinge ribbon comes to an end.

2. A machine of the character described, comprising, an upright framework, a magazine for leaves to be hinged mounted above said framework, means for feeding the leaves from said magazine downwardly, a guideway below said magazine to receive the fed leaves, means for stopping the leaves in the guideway, means for forming hinges and applying the hinges to the leaves while they are stopped in the guideway, means for feeding a long ribbon of hinge material to said forming and applying means, means for receiving and restacking the leaves after they have been hinged, driving mechanism for actuating all of said means in timed sequence in a continuous operating cycle, an electric motor having a power connection with said driving mechanism, means for actuating said driving mechanism manually, safety means to prevent starting of said motor when said manual drive-actuating means is in condition for use, and an automatic shut-off for stopping said motor when the hinge ribbon comes to an end.

3. In combination in a machine of the character described, a magazine for supporting a plurality of catalogue or file leaves to be hinged, a chute alined with said magazine for receiving the leaves, means for consecutively feeding the leaves into said chute, a stop for halting each leaf at an intermediate point in said chute, hinge-forming and applying means located to receive a thin steel ribbon from a roll to form therefrom and apply a hinge to the margin of the leaf while the latter is thus halted by said stop, a second stop spaced from said first stop, means for actuating said stops in unison to remove said first stop from the path of the leaf and to interpose said second stop in said path to halt the leaf at a second intermediate point in said chute to receive a second hinge from said hinge-applying means, means for receiving and ejecting the hinged leaf from said chute, means coordinated in operation with said feeding means and said ejecting means for recording the number of leaves passing through said chute, means for actuating all of said means in coordination, means for controlling the operation of said actuating means, and means responsive to discontinuance of the hinge ribbon to act upon said controlling means for halting said actuating means.

4. In combination in a machine of the character described, means for supporting catalogue or file leaves to be hinged, means for applying hinges to the leaves, means for feeding the leaves successively to said applying means, and means for correlating the operations of said feeding means and said hinge-applying means including a trip device responsive to the advance of each successive leaf to a given point to halt said feeding means and a device for resetting the trip device in timed relation to the operation of said hinge-applying means to effect resumption of operation of said feeding means for delivering the next leaf into hinge-receiving position after the preceding leaf has been acted upon by said hinge-applying means.

5. In combination in a machine of the character described, a magazine for leaves to be hinged, means for applying hinges to the leaves, means for feeding successive leaves from said magazine to said applying means, means for driving said hinge-applying means and said feeding means, clutch mechanism for controlling operation of said feeding means, a latch arm coactive with said clutch mechanism adapted to maintain the latter in its operative condition, trigger mechanism for normally holding said arm in latching position, means located to be engaged by the successive leaves for actuating said trigger mechanism to release said latch arm from latching position, and means for resetting said clutch mechanism in timed relation to operation of said hinge-applying means.

6. In combination in apparatus of the character described, a leaf magazine, means for feeding the leaves from the magazine successively, a chute for receiving the fed leaves, alternately operable releasable means for successively halting each leaf at two different places in the chute, and means for operating upon a selected longitudinal margin of the leaf at two separate points determined by the relative positions of the leaf while successively halted.

7. In combination in a machine of the character described, a magazine for supporting a plurality of catalogue or file leaves to be hinged, a vertical chute below and alined with said magazine to receive a leaf, means for selecting and feeding a leaf into said chute, a stop for halting the selected leaf at an intermediate point in said chute, hinge-applying means located to apply a hinge at a predetermined place on one margin of the leaf while the leaf is halted by said stop, a second stop spaced downwardly from said first stop, and means for actuating said stops to remove said first stop from the path of the leaf and to interpose said second stop in said path to halt the leaf at a second intermediate point in said chute to receive a hinge from said hinge-applying means at a second predetermined place on said margin.

8. In combination in a machine of the character described, means for receiving and guiding a leaf in a predetermined path, mechanism located at an intermediate point of said guiding means for acting upon the leaf, a pair of spaced stop members for successively halting the leaf at spaced intervals adjacent to said mechanism, means for receiving and restacking the hinged leaves, a driven shaft, a cam member on said shaft, and means actuated by said cam member for operating said stop members and said restacking means in predetermined sequence correlated with the operation of said mechanism.

9. In combination in apparatus of the character described, means for receiving a strip of hinge material, an arbor, means for advancing the strip to a position adjacent to said arbor, a forming table for engaging the forward end portion of the strip, a stationary shear located to engage the strip rearwardly of the arbor, a former including a shearing edge adapted to coact with said stationary shear to sever the strip and being adapted to coact with said table to bend the severed portion of the strip about said arbor to form a hinge, and means for stripping the hinge from the arbor.

10. Hinge forming mechanism of the character described comprising, in combination, means for feeding a strip of hinge material into position, means for striking a prong near the end of said strip, means for punching an aperture in the strip in longitudinally spaced relation to said prong, a forming arbor, means for moving said strip into position adjacent to said arbor, and means for severing the pronged and apertured section of the strip and bending the section about said arbor to bring the aperture and prong toward registration.

11. In a hinge forming device, in combination, an arbor, a forming table having a tapered nose located at one side of said arbor, said nose having a groove partially to receive said arbor, means for positioning a hinge blank between said arbor and said nose, a movable former having a substantially V-shaped recess annularly grooved at the apex to receive said arbor, and means for relatively moving said former and said nose to shape the hinge blank about said arbor and bring said arbor into coaxial relationship to the grooves to form the interposed portion of the hinge blank into an annular sleeve.

12. In a hinge forming device, in combination, an arbor, a forming table having a tapered nose located at one side of said arbor, said nose having a groove partially to receive said arbor, means for positioning a hinge blank between said arbor and said nose, a movable former having a substantially V-shaped recess annularly grooved at the apex to receive said arbor, means for relatively moving said former and said nose to shape the hinge blank about said arbor and bring said arbor into coaxial relationship to the grooves to form the interposed portion of the hinge blank into an annular sleeve, and means for indenting a portion of the hinge blank adjacent to the sleeve.

13. In a hinge forming device, in combination, mechanism for feeding a ribbon of hinge material to the device, means for punching an aperture and a prong to extend through said aperture in longitudinally spaced relation in a hinge section in the end portion of the ribbon, means for severing and then completing a hinge from a previously partially prepared section by bending the opposite end portion of the severed section to bring said prong and aperture toward registry, and means for actuating both of said punching means and said severing and completing means together.

14. In combination in a hinging machine which is substantially complete in itself; a frame having thereon means for supporting leaves to be hinged, means for applying hinges to the leaves, means for feeding the leaves to said applying means, and means for driving said feeding means and said applying means; said driving means including a power shaft adapted at one end to receive a handle for manual actuation; a motor mounted on said frame and connected with the other end of said power shaft; a drive shaft for said feeding means geared to said power shaft; and means for transmitting motion from said power shaft to said applying means.

15. In combination in a machine of the character described, means for supporting a plurality of catalogue or file leaves to be hinged, hinge-applying means, means for successively feeding the leaves to said hinge-applying means, means for restacking the leaves after they are hinged, power or manually operable driving mechanism for actuating all of said means coordinately, and safety means permitting only alternative power or manual operation of said driving mechanism.

16. In combination in a machine of the character described, means for supporting a stack of leaves to be hinged, means for feeding successive leaves from the stack, means for applying hinges to the successive leaves, common driving mechanism for both said feeding means and said hinge-applying means, a prime mover for actuating said driving means at high speed, a shaft adapted for connection thereto of a hand crank for actuation of said driving means manually, and safety means associated with said shaft arranged to prevent operation of said prime mover when the handle is operatively connected to said shaft.

17. In a machine of the character described, in combination, forming mechanism, means for supplying a ribbon of material to be formed to said mechanism, means for driving said mechanism including power and manual actuating means, safety means permitting only alternative power or manual actuation, and shut-off means for halting said power means automatically when the ribbon comes to an end.

18. In combination in a machine of the character described, means for supporting a stack of catalogue or file leaves to be hinged, means for applying hinges to said leaves, means for supplying a ribbon of hinge material to said applying means, means for successively feeding the leaves from the stack to said applying means, means for driving said feeding means and said applying means, and means for automatically halting said driving means when the ribbon ends.

19. In combination in a machine of the character described, means for forming hinges to be applied to catalogue leaves or the like, means for feeding a ribbon of hinge material to said forming means, means for driving said forming means, control means for said driving means, and means normally coactive with said ribbon and including a mechanical connection operative to actuate said control means for halting said driving means when the ribbon ends, said connection including a lost motion arrangement whereby said control means may be actuated for halting the driving means while the ribbon is unexhausted.

20. Apparatus of the character described comprising, in combination, die means, punching means cooperative with said die means to strike an integral prong from a ribbon of hinge material interposed therebetween, said die means and said punching means, following the striking of a prong thereby, being relatively movable into spaced relation a sufficient distance to permit clearance of the prong, and means for advancing the ribbon including a reciprocable member operable in the space between said die means and said punching means to engage the newly formed prong and apply ribbon-moving force thereto in a direction longitudinally of the ribbon.

21. A machine for hinging catalogue or file leaves comprising, in combination, means for supporting a stack of leaves to be hinged, means for feeding the leaves successively from the stack, means for driving the feeding means including a driving shaft and a driven shaft, clutch mechanism between said shafts including a rotary member driven by said driving shaft and having an axially shiftable hub, engagement elements projecting from one axially directed face of said rotary member, a gear operative to effect rotation of said driven shaft mounted coaxially with said rotary member adjacent to said axially directed face and having teeth in its opposing face to be engaged by said engagement elements, means for receiving each leaf as it is fed from the stack by said feeding means, means associated with said receiving means for applying hinges to the fed leaves, means for actuating said driving shaft and for actuating said hinge applying means cyclically, and means operated by rotation of said driving shaft for axially shifting said hub in timed relation to said hinge applying means to effect a periodic interengagement of said elements and said teeth whereby to actuate said feeding means.

22. A machine for hinging catalogue or file leaves comprising, in combination, means for feeding a leaf at a time from a stack of leaves to be hinged including a driving shaft and a driven shaft, an axially shiftable rotatable member constantly driven by said driving shaft, means arranged to interengage with said member for actuating said driven shaft, an intermediately pivoted actuator coacting at one of its end portions with said member for axially shifting the latter, shifter means engaging the end portion of said actuator remote from said member normally to hold said member out of engagement with said first mentioned means, means for applying hinges to the individual leaves fed from the stack by said feeding means, means periodically operative in timed relation to said hinge-applying means for operating said shifter means to pivot said actuator to move said member into engagement with said first mentioned means, and releasable means for engaging said one end portion of said actuator to maintain the interengaged condition of the member for a time interval predetermined by the speed with which each leaf is fed to said hinge-applying means.

23. A machine of the character described comprising, in combination means for supporting a stack of leaves to be operated upon, intermittently operable means for feeding the leaves one at a time from said supporting means having operating mechanism including a rotary actuating shaft and means controlled by rotation of the latter for initiating operation of said feeding means once in each full revolution of said actuating shaft, a driving shaft geared with said actuating shaft to rotate four times as fast, means for receiving the fed leaves, means associated with said receiving means for operating upon the fed leaves, a rotary operating shaft for actuating said last mentioned means once in each full revolution, and means for rotating said driving shaft and simultaneously rotating said operating shaft at one half the speed of said driving shaft and twice as fast as the speed of said actuating shaft, whereby said means for operating upon the fed leaves will be operated twice for every operation of said feeding means.

24. In combination in apparatus of the character described, an arbor, a forming table, forming means movable about said arbor to cooperate with said table for bending a hinge blank about said arbor, and means for supporting a leaf in edgewise alinement with said arbor so as to be engaged by the bent hinge blank.

25. In combination in apparatus of the character described, an axially movable arbor, means for locating a leaf to be hinged edgewise adjacent to said arbor, means for feeding a hinge blank to said arbor, means for bending said blank around said arbor to form a hinge sleeve thereabout and a pair of legs extending therefrom to engage the leaf therebetween, means for axially moving said arbor after said hinge sleeve has been formed, and means for stripping the formed hinge from the arbor as an incident to said axial movement so that the hinge and the associated leaf can be removed.

26. In combination in apparatus of the character described, means for receiving a strip of hinge material, an arbor, means for locating a leaf to be hinged adjacent to said arbor, means for advancing the strip to a position adjacent to said arbor and with the forward end portion of the strip lying on one side of said leaf, a forming table for engaging said forward end portion, a stationary shear member located to engage the strip rearwardly of the arbor, a former including a shearing edge adapted to coact with said stationary shear member to sever the strip, said former being adapted to coact with said table after the shearing operation to bend the severed portion of the strip about said arbor and against the opposite side of the leaf, and means for stripping the hinge from the arbor to enable removal of the hinge and associated leaf.

27. Apparatus of the character described comprising, in combination, means for feeding a strip of hinge material into position, means for striking out a prong near the end of said strip, means for punching an aperture in said strip in longitudinally spaced relation to said prong, a forming arbor, means for locating a leaf to be hinged closely adjacent to said arbor, means for moving said strip into position adjacent to said arbor, and means for severing the pronged and apertured section of the strip and bending the section about said arbor to engage the leaf between the opposed portions of the bent section and to bring the aperture and prong toward registration.

28. Apparatus of the character described comprising, in combination, an arbor, means for locating a leaf to be hinged closely adjacent to said arbor, a forming table having a tapered nose located at one side of said arbor and the leaf, said nose having a groove to receive said arbor, means for positioning a hinge blank between said arbor and said nose, a movable former having a substantially V-shaped recess annularly grooved at the apex to receive said arbor, means for relatively moving said former and said nose to shape the hinge blank about said arbor and bring said arbor into coaxial relationship to the grooves to form the interposed portion of the hinge blank into an annular sleeve having opposed legs extending therefrom and engaging the leaf therebetween, and means for indenting a portion of the hinge blank adjacent to the sleeve to bite into the edge portion of the leaf.

29. In combination, an apparatus of the character described, supporting means defining an open chamber, an arbor mounted to extend transversely of the opening to said chamber, means for locating a leaf to be hinged adjacent to said arbor, forming means including a head mounted to travel out of said chamber to coact with said arbor for bending a hinge blank thereabout, means cooperative with said head to affix the bent hinge blank to the leaf, and means for actuating said head.

30. In combination in apparatus of the character described, a forming arbor, means for properly supporting a leaf to be hinged adjacent to said arbor, means for feeding a hinge blank into position adjacent to said arbor and the leaf, a forming table, a forming head adapted to coact with the arbor and the forming table to bend the hinge blank and apply the same to the leaf, and means providing a pivot for one side of said head so that said head can be swung on a radius toward and away from the arbor and said forming table.

31. In apparatus of the character described, in combination, a hinge forming arbor, means for supporting a catalogue leaf to be hinged edgewise adjacent to and in a plane coincident with the axis of said arbor, means for feeding a hinge strip portion including longitudinally spaced leaf engaging means into position adjacent to said arbor, and means for bending said strip portion about said arbor to carry the leaf engaging means toward the respectively opposite sides of the adjacent margin of said leaf whereby to secure the strip portion as a completed hinge member onto the sheet margin.

32. Hinge forming and applying apparatus of the character described comprising, in combination, an arbor, means for supporting a leaf to be hinged with its margin adjacent to and parallel with said arbor, a forming member adjacent to said arbor and lying on one side of the leaf margin, means for interposing a portion of a hinge strip between said forming member and said arbor and adjacent face of the leaf margin, and driven forming means arranged to bend another portion of the hinge strip about said arbor toward the opposite face of the leaf margin, said forming member and said driven forming means cooperating to press the opposite portions of said hinge strip against the interposed leaf margin and acting with the arbor to form a pintle sleeve in the intermediate part of the hinge strip along the edge of the leaf margin.

33. A machine for providing catalogue leaves or the like with hinges comprising, in combination, means for supporting a leaf to be hinged, means for feeding a strip of flat hinge material into a predetermined position adjacent to the margin of the leaf, means for bending the opposite end sections of the hinge strip onto the opposite sides of the leaf margin, means for shaping a part of said hinge strip intermediate said end sections into a pintle sleeve parallel to the adjacent edge of the leaf, and means for pressing a portion of one of said end sections of the hinge near the pintle sleeve into the leaf margin to hold the hinge against displacement longitudinally of said edge.

34. A hinge forming apparatus of the character described comprising, in combination, a supporting structure, an arbor carried thereby, means for intermittently feeding a strip of flat hinge material into position to be bent about said arbor, a forming member mounted to engage a portion of the hinge strip on one side of the arbor for bending it through an arcuate path in one direction relative to the arbor periphery, a second forming member having a face located to engage the portion of the hinge strip on the opposite side of the arbor and being arranged to cooperate with the first mentioned forming member in shaping the strip into substantially U-shape with the portion of the hinge that engages the arbor providing a pintle sleeve, and means on one of said members acting in the last phase of the hinge-forming coaction of the members to drive inwardly toward the opposite portion of the hinge and out of its principal plane a limited part near the pintle sleeve end of the hinge portion engaged by said one member to penetrate a leaf or the like onto which the hinge may be fastened and serve as means for holding the hinge against displacement relative to such leaf.

35. In combination in a hinge forming machine of the character described, an arbor, means for delivering a strip of hinge material adjacent to said arbor and transversely relative to the axis of the latter, a movable forming table normally spaced from said arbor sufficiently to permit the end portion of the hinge strip to extend therebetween, a former mounted for movement relative to said arbor including means for bending an intermediate portion of the hinge strip about said arbor, and means carried by said former and operative in advance of said bending means to move said forming table toward the hinge strip for carrying the latter into engagement with said arbor and holding it there as said bending means enters into bending engagement with the strip.

36. In combination in a machine adapted to make hinges for catalogue leaves or the like, forming mechanism including an arbor and means for bending a hinge blank about the arbor to form a pintle sleeve and a pair of opposed legs for engaging the margin of a selected leaf therebetween, a stripper associated with said arbor, means supporting said arbor for axial movement relative to said stripper to effect withdrawal of the arbor from a completed hinge, periodically operable means for feeding a strip of hinge material to said forming mechanism transversely of and adjacent to said arbor, means for operating said bending means and said feeding means in timed sequence, and a device actuated in response to operations of said feeding means for moving said arbor supporting means to withdraw the arbor from a completed hinge following release of the hinge by said bending means and then returning said arbor for the formation of another hinge thereabout.

37. In combination in an apparatus of the character described, a leaf magazine, means for feeding the leaves successively downwardly edgewise from the magazine, a chute for receiving the fed leaves and serving to guide gravitational downward movement thereof, releasable means providing a rest engageable by the lower edges of the leaves for halting the leaves at a given point in the chute, means for operating upon a selected margin of the leaves while the leaves are halted within the chute, and means for actuating said halting means in timed sequence with said operating means to release the leaves for further movement down the chute after they have been operated upon.

38. In combination in an apparatus of the character described, means for supporting a plurality of leaves to be fed therefrom successively, an elongated vertical guideway for receiving the fed leaves thereinto at the top, means for engaging and operating upon a selected margin of the leaves within said guideway, movable means for halting the leaves in said guideway in position for operation thereon by said operating means, means at the lower end of said guideway for receiving the leaves therefrom and arranged to shift the leaves out of the guideway, and means for actuating said operating means, said halting means and said receiving means in timed order.

39. In combination in an apparatus of the character described, a hinge forming and applying unit including an arbor and means for bending an elongated hinge blank about said arbor to form a hinge and simultaneously apply the same to the margin of a catalogue or file leaf, means for successively feeding leaves to be hinged into a general position adjacent to said arbor, means for actuating said forming means, and means having a driving connection with said actuating means for engaging the leaves after they are in the general position and before the hinges are applied to push the leaves laterally toward and hold them in predetermined edgewise relation to said arbor so as to assure uniform location of the applied hinges upon the leaf margins.

40. The method of making a hinge for application to a catalogue leaf or the like which includes striking out a prong and forming an aperture to receive the prong at longitudinally spaced points of a strip of flat hinge material, bending the strip into a pair of opposed legs to bring said prong and said aperture toward registration and forming a pintle-receiving sleeve at the bend, and striking part of one of the legs of the strip near the pintle-receiving sleeve inwardly to provide means to cooperate with the prong in holding the hinge in fixed relation to the margin of an associated leaf.

41. The method of making and applying a hinge to a catalogue leaf or the like comprising striking a prong from one end portion of a strip of flat hinge material of predetermined length and forming an aperture in the opposite end portion of the strip, bending the strip to form a pair of legs and forcing the legs together to grip the margin of the leaf therebetween and to drive the prong through the leaf to project through said aperture, coincident with bending of the strip forming a pintle-receiving sleeve at the bend parallel with the edge of the leaf, bending over the projecting end of the prong into clinching relation to the apertured leg, and forcing a portion of one of the legs near the pintle-receiving sleeve inwardly toward the opposite leg and into the leaf margin to cooperate with the prong in holding the hinge firmly against displacement from the attached position on the leaf.

42. An apparatus for making a hinge for application to a catalogue leaf or the like including, in combination, means for striking out a prong and forming an aperture to receive the prong at longitudinally spaced points of a strip of flat hinge material, means for bending the strip into a pair of opposed legs to bring said prong and said aperture toward registration and for forming a pintle-receiving sleeve at the bend, and means for striking part of one of the legs of the strip near the pintle-receiving sleeve inwardly to cooperate with the prong in holding the hinge in fixed relation to the margin of an associated leaf.

43. An apparatus for making and applying a hinge to a catalogue leaf or the like comprising, in combination, means for striking a prong from one end portion of a strip of flat hinge material of predetermined length and for forming an aperture in the opposite end portion of the strip, means for bending the strip to form a pair of legs and for forcing the legs together to grip the margin of the leaf therebetween and to drive the prong through the leaf to project through the aperture, means operable coincident with the bending of the strip for forming a pintle-receiving sleeve at the bend parallel with the edge of the leaf, means for bending over the projecting end of the prong into clinching relation to the apertured leg, and means for forcing a portion of one of the legs near the pintle-receiving sleeve inwardly toward the opposite leg and into the leaf margin to cooperate with the prong in holding the hinge firmly against displacement from the attached position on the leaf.

44. A machine for hinging catalogue or file leaves including, in combination, means for applying to a leaf margin hinges each comprising a pintle sleeve and opposed leaf-gripping legs, means for locating a leaf with a selected edge alined with said applying means to receive a hinge with the pintle sleeve parallel to the edge and the legs disposed on opposite sides of the leaf margin adjoining said edge, said leaf-locating means being operable to effect a shifting and relocation of the leaf while in hinge-receiving relation to said applying means to permit application of another hinge at a spaced point on the same margin of the leaf, and means for driving said applying means and said leaf-locating means in timed sequence.

HURLEY D. RALSTON.
OTTO FELIX.